United States Patent
Felstaine et al.

(10) Patent No.: US 9,760,428 B1
(45) Date of Patent: Sep. 12, 2017

(54) SYSTEM, METHOD, AND COMPUTER PROGRAM FOR PERFORMING PREVENTATIVE MAINTENANCE IN A NETWORK FUNCTION VIRTUALIZATION (NFV) BASED COMMUNICATION NETWORK

(71) Applicant: Amdocs Software Systems Limited, Dublin (IE)

(72) Inventors: Eyal Felstaine, Hertzeliya (IL); Ofer Hermoni, Yavne (IL); Nimrod Sandlerman, Ramat-Gan (IL)

(73) Assignees: Amdocs Software Systems Limited, Dublin (IE); Amdocs Development Limited, Limassol (CY)

( * ) Notice: Subject to any disclaimer, the term of this patent is extended or adjusted under 35 U.S.C. 154(b) by 199 days.

(21) Appl. No.: 14/572,732

(22) Filed: Dec. 16, 2014

Related U.S. Application Data

(60) Provisional application No. 61/918,597, filed on Dec. 19, 2013, provisional application No. 61/941,380, filed on Feb. 18, 2014, provisional application No. 61/981,116, filed on Apr. 17, 2014, provisional application No. 62/026,508, filed on Jul. 18, 2014, provisional application No. 62/026,512, filed on Jul.

(Continued)

(51) Int. Cl.
| | |
|---|---|
| G06F 11/00 | (2006.01) |
| G06F 11/07 | (2006.01) |
| H04L 29/08 | (2006.01) |
| G06F 11/20 | (2006.01) |

(52) U.S. Cl.
CPC ...... *G06F 11/0793* (2013.01); *G06F 11/0709* (2013.01); *G06F 11/2023* (2013.01); *H04L 67/10* (2013.01)

(58) Field of Classification Search
CPC ............. G06F 11/0709; G06F 11/0793; G06F 11/1425; G06F 11/2023; G06F 11/203; G06F 11/2033; H04L 67/10
See application file for complete search history.

(56) References Cited

U.S. PATENT DOCUMENTS

| | | |
|---|---|---|
| 6,345,239 B1 | 2/2002 | Bowman-Amuah |
| 6,427,132 B1 | 7/2002 | Bowman-Amuah |
| 6,611,867 B1 | 8/2003 | Bowman-Amuah |

(Continued)

FOREIGN PATENT DOCUMENTS

| | | |
|---|---|---|
| WO | 01/07170 A1 | 2/2001 |
| WO | 01/16849 A2 | 3/2001 |

(Continued)

OTHER PUBLICATIONS

Network Functions Virtualisation—Introductory White Paper, Oct. 22-24, 2012, Issue 1, pp. 1-16.*

*Primary Examiner* — Marc Duncan
(74) *Attorney, Agent, or Firm* — Zilka-Kotab, PC

(57) ABSTRACT

A system, method, and computer program product are provided for performing preventative maintenance in a Network Function Virtualization based (NFV-based) communication network. In use, a first potential fault is identified in a first resource in an NFV-based communication network. Additionally, a first time for maintaining the first resource is identified to prevent an occurrence of the first potential fault. Further, a second resource is identified for replacing the first resource during the first time.

8 Claims, 16 Drawing Sheets

Related U.S. Application Data 18, 2014, provisional application No. 62/027,709, filed on Jul. 22, 2014.

(56) References Cited

U.S. PATENT DOCUMENTS

| | | | |
|---|---|---|---|
| 6,629,081 B1 | 9/2003 | Cornelius et al. | |
| 6,983,037 B2 | 1/2006 | Argo | |
| 7,069,234 B1 | 6/2006 | Cornelius et al. | |
| 7,103,509 B2* | 9/2006 | Shah | G01D 3/08 700/52 |
| 7,167,844 B1 | 1/2007 | Leong et al. | |
| 7,610,233 B1 | 10/2009 | Leong et al. | |
| 7,721,157 B2* | 5/2010 | Spitz | G06F 11/008 714/47.2 |
| 7,860,232 B2 | 12/2010 | Huang | |
| 8,023,425 B2 | 9/2011 | Raleigh | |
| 8,023,494 B2 | 9/2011 | Takeda | |
| 8,140,914 B2* | 3/2012 | Murphy | G06F 11/008 714/47.1 |
| 8,166,176 B2 | 4/2012 | Kumar et al. | |
| 8,229,812 B2 | 7/2012 | Raleigh | |
| 8,250,207 B2 | 8/2012 | Raleigh | |
| 8,270,310 B2 | 9/2012 | Raleigh | |
| 8,270,952 B2 | 9/2012 | Raleigh | |
| 8,312,318 B2* | 11/2012 | Graham | G06F 11/1484 714/11 |
| 8,321,526 B2 | 11/2012 | Raleigh | |
| 8,326,958 B1 | 12/2012 | Raleigh | |
| 8,331,901 B2 | 12/2012 | Raleigh | |
| 9,128,899 B1* | 9/2015 | McAlister | G06F 11/203 |
| 9,275,172 B2* | 3/2016 | Ostermeyer | G06F 17/5009 |
| 9,594,620 B2* | 3/2017 | Xia | G06F 11/004 |
| 2006/0195715 A1* | 8/2006 | Herington | G06F 9/5077 714/4.2 |
| 2008/0095138 A1 | 4/2008 | Wu et al. | |
| 2008/0250265 A1* | 10/2008 | Chang | G06F 11/008 714/4.12 |
| 2010/0085914 A1 | 4/2010 | Kunniyur et al. | |
| 2010/0188975 A1 | 7/2010 | Raleigh | |
| 2010/0188990 A1 | 7/2010 | Raleigh | |
| 2010/0188991 A1 | 7/2010 | Raleigh | |
| 2010/0188992 A1 | 7/2010 | Raleigh | |
| 2010/0188993 A1 | 7/2010 | Raleigh | |
| 2010/0188994 A1 | 7/2010 | Raleigh | |
| 2010/0188995 A1 | 7/2010 | Raleigh | |
| 2010/0190470 A1 | 7/2010 | Raleigh | |
| 2010/0191575 A1 | 7/2010 | Raleigh | |
| 2010/0191576 A1 | 7/2010 | Raleigh | |
| 2010/0191604 A1 | 7/2010 | Raleigh | |
| 2010/0191612 A1 | 7/2010 | Raleigh | |
| 2010/0191613 A1 | 7/2010 | Raleigh | |
| 2010/0191846 A1 | 7/2010 | Raleigh | |
| 2010/0191847 A1 | 7/2010 | Raleigh | |
| 2010/0192120 A1 | 7/2010 | Raleigh | |
| 2010/0192170 A1 | 7/2010 | Raleigh | |
| 2010/0192207 A1 | 7/2010 | Raleigh | |
| 2010/0192212 A1 | 7/2010 | Raleigh | |
| 2010/0333089 A1* | 12/2010 | Talwar | G06F 11/004 718/1 |
| 2011/0022882 A1* | 1/2011 | Jaehde | G06F 11/2023 714/4.1 |
| 2011/0103374 A1 | 5/2011 | Lajoie et al. | |
| 2011/0107364 A1 | 5/2011 | Lajoie et al. | |
| 2011/0107379 A1 | 5/2011 | Lajoie et al. | |
| 2012/0030335 A1* | 2/2012 | Machida | G06F 11/1438 709/223 |
| 2012/0088470 A1 | 4/2012 | Raleigh | |
| 2012/0089845 A1 | 4/2012 | Raleigh | |
| 2012/0134291 A1 | 5/2012 | Raleigh | |
| 2012/0195206 A1 | 8/2012 | Raleigh | |
| 2012/0195222 A1 | 8/2012 | Raleigh | |
| 2012/0195223 A1 | 8/2012 | Raleigh | |
| 2012/0196565 A1 | 8/2012 | Raleigh | |
| 2012/0197792 A1 | 8/2012 | Raleigh | |
| 2012/0201133 A1 | 8/2012 | Raleigh | |
| 2012/0203677 A1 | 8/2012 | Raleigh | |
| 2012/0208496 A1 | 8/2012 | Raleigh | |
| 2012/0209750 A1 | 8/2012 | Raleigh | |
| 2012/0210391 A1 | 8/2012 | Raleigh | |
| 2012/0214441 A1 | 8/2012 | Raleigh | |
| 2013/0182714 A1* | 7/2013 | Vachharajani | H04L 45/44 370/400 |
| 2013/0219043 A1* | 8/2013 | Steiner | G06F 9/4856 709/224 |
| 2013/0332927 A1* | 12/2013 | Tang | G06F 9/45545 718/1 |
| 2015/0160961 A1* | 6/2015 | Johnson | H04L 63/0272 718/1 |
| 2015/0193325 A1* | 7/2015 | Harsan-Farr | G06F 11/008 702/186 |
| 2016/0203064 A1* | 7/2016 | Ren | G06F 11/08 714/4.12 |

FOREIGN PATENT DOCUMENTS

| | | |
|---|---|---|
| WO | 01/17169 A2 | 3/2001 |
| WO | 01/17313 A1 | 3/2001 |
| WO | 01/46846 A2 | 6/2001 |
| WO | 01/46889 A2 | 6/2001 |
| WO | 2010/088072 A1 | 8/2010 |
| WO | 2010/088073 A1 | 8/2010 |
| WO | 2010/088074 A1 | 8/2010 |
| WO | 2010/088075 A1 | 8/2010 |
| WO | 2010/088076 A1 | 8/2010 |
| WO | 2010/088080 A1 | 8/2010 |
| WO | 2010/088081 A1 | 8/2010 |
| WO | 2010/088082 A1 | 8/2010 |
| WO | 2010/088083 A1 | 8/2010 |
| WO | 2010/088085 A1 | 8/2010 |
| WO | 2010/088086 A1 | 8/2010 |
| WO | 2010/088087 A1 | 8/2010 |
| WO | 2010/088094 A1 | 8/2010 |
| WO | 2010/088095 A1 | 8/2010 |
| WO | 2010/088096 A1 | 8/2010 |
| WO | 2010/088097 A1 | 8/2010 |
| WO | 2010/088098 A1 | 8/2010 |
| WO | 2010/088100 A1 | 8/2010 |
| WO | 2010/088101 A1 | 8/2010 |
| WO | 2011/053858 A1 | 5/2011 |

\* cited by examiner

SYSTEM, METHOD, AND COMPUTER PROGRAM FOR PERFORMING PREVENTATIVE MAINTENANCE IN A NETWORK FUNCTION VIRTUALIZATION (NFV) BASED COMMUNICATION NETWORK

CLAIM OF PRIORITY AND RELATED APPLICATIONS

This application claims the benefit of: U.S. Provisional Application No. 61/918,597, filed Dec. 19, 2013; U.S. Provisional Application No. 61/941,380, filed Feb. 18, 2014; U.S. Provisional Application No. 61/981,116, filed Apr. 17, 2014; U.S. Provisional Application No. 62/026,508, filed Jul. 18, 2014; U.S. Provisional Application No. 62/026,512, filed Jul. 18, 2014; and U.S. Provisional Application No. 62/027,709, filed Jul. 22, 2014, the entire contents of which are incorporated herein by reference.

FIELD OF THE INVENTION

The present invention relates to telecommunications and/or data communications and, more particularly to network function virtualization (NFV) of telecommunications networks.

BACKGROUND

Network Function Virtualization is a term or a name of a proposed architecture of telecom services as published by the European Telecommunications Standards Institute (ETSI) in a series of documents available from the ETSI website. NFV uses generic hardware platform and software adapted for the generic hardware platform. Thus, NFV creates a network much more flexible and dynamic than a legacy communication network. In NFV-based networks, a Virtual Network Function (VNF) decouples the software implementation of the network function from the infrastructure resources it runs on by virtualization. A network service is based on one or more VNFs and/or Physical Network Functions (PNFs), their interconnections, and chaining definitions. The VNFs can be executed on almost any generic hardware processing facility. Therefore, VNFs may be installed, removed, and moved between hardware facilities, much more easily, less costly and thus, more frequently.

The flexibility of the NFV-based network enhances the means available for optimizing the network's capacity and performance. However, current techniques for performing preventative maintenance in such networks are limited.

There is thus a need for addressing these and/or other issues associated with the prior art.

SUMMARY

A system, method, and computer program product are provided for performing preventative maintenance in a Network Function Virtualization based (NFV-based) communication network. In use, a first potential fault is identified in a first resource in an NFV-based communication network. Additionally, a first time for maintaining the first resource is identified to prevent an occurrence of the first potential fault. Further, a second resource is identified for replacing the first resource during the first time.

DETAILED DESCRIPTION

Figure 1:
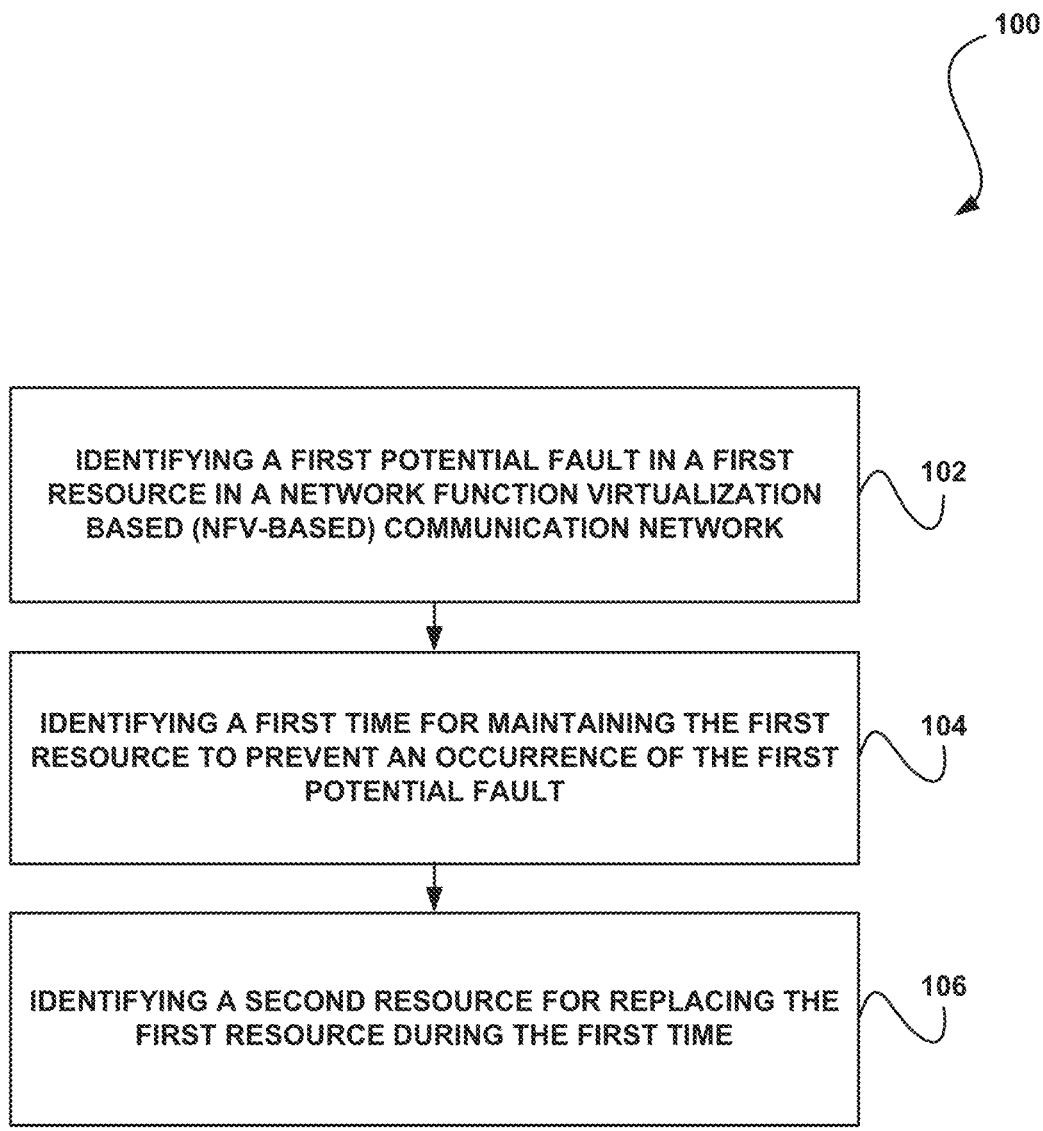
FIG. 1 illustrates a method for performing preventative maintenance in an NFV-based communication network, in accordance with one embodiment.

FIG. 1 illustrates a method 100 for performing preventative maintenance in a Network Function Virtualization based (NFV-based) communication network, in accordance with one embodiment.

As shown, a first potential fault is identified in a first resource in an NFV-based communication network. See operation 102. In some cases, the first potential fault may be associated with a previously occurring fault.

Additionally, a first time for maintaining the first resource is identified to prevent an occurrence of the first potential fault. See operation 104.

Further, a second resource is identified for replacing the first resource during the first time. See operation 106.

In one embodiment, the method 100 may further include planning for migrating a virtual network function (VNF) and/or VNF instance using the first resource to use the second resource during the first time. In another embodiment, the method 100 may include migrating (e.g. prior to the first time) a VNF and/or VNF instance using the first resource to use the second resource.

In another embodiment, the method 100 may include securing availability (e.g. performance availability, etc.) of the second resource for a VNF for the first time. Additionally, a VNF and/or VNF instance using the first resource may be migrated to use the second resource, where the migration does not deteriorate a service provided by the VNF (and/or VNF instance).

Further, in one embodiment, the method 100 may include migrating a VNF and/or VNF instance using the first resource to use the second resource, where the migration does not deteriorate a service provided with the VNF. Still yet, the method 100 may include migrating a VNF and/or VNF instance using the first resource to use the second resource, where the migration preserves service continuity provided by the VNF.

In the context of the present description, the terms "network" and "communication network" refer to the hardware and software connecting one or more communication elements including wireline networks, wireless networks, and/or combinations thereof.

The terms "network function virtualization" (NFV) and virtual network function (NFV) are described in a series of documents published by the European Telecommunications Standards Institute (ETSI) and available from the ETSI website. The term "virtual network function or feature" (VNF) refers to a particular implementation of a function, a feature, or a service provided by the network, internally within the network, or externally to a customer, subscriber, end-user, a terminal or a server. A VNF may include the software program implementation of the function or feature or service. The term VNF instance (VNF-I) refers to a particular process or task executing the VNF program by a particular virtual machine or processor or computing facility and/or used by a particular customer (or subscriber, end-user, terminal or server, etc.).

The term "service" refers to any type of use (such as a use case) that an NFV-based communication network may offer or provide to one or more communication elements. A service may include switching data or content between any number of elements, providing content from a server to a communication element or between servers, securing and protecting communication and content, processing content provided by the customer or by a third party, providing backup and redundancy, etc. A service may be using partial functionality of a VNF or may include one or more VNFs and/or one or more VNF instances forming a service sub-network (or interconnection model). In the context of the present description, the term "chain" may refer to such service sub-network, such as a particular plurality of VNFs and/or VNF instances associated with a particular service type or a service instance.

The term "deployment", when referring to hardware elements, including processing elements, memory elements, storage elements, connectivity (communication) elements, etc., refer to the configuration or topology of these hardware elements creating the NFV-based network. The term "deployment", when referring to software elements, such a VNFs and VNF instances, refers to the association between such software elements and hardware elements.

The term "deployment optimizations" refers to association of software and hardware elements in a manner that satisfies a particular set of requirements and/or rules, such as load-related and performance-related requirements, or a manner that makes a better use of a particular hardware deployment, such as by reducing operational cost.

The terms "service deployment optimization", or "service optimization" or "chain optimization" refer to optimizing the deployment of a service chain, i.e., optimizing the deployment of one or more VNF instances making a particular service. The terms chain optimization and service optimization may thus be used interchangeably.

The term "session" refers to a communication connection between two or more entities that persists for a period of time during which data may be exchanged there between. A session may be implemented and managed by a session layer in the corresponding network protocol. The term session may include a network session and a logical session. The network session may be associated with the devices used to communicate, while the logical session may be associated with the communicating parties (users) and may persist regardless of the communication means that the parties are using.

The term "service continuity" includes and applies to the terms "session continuity" and "streaming continuity". Streaming refers to streaming media, session or service, such as sound (including voice), video, multimedia, animation, etc. The term service usually applies to a group of VNFs (or the functionality provided by the group of VNFs) but may also apply to a single VNF (or the functionality provided by the VNF). The term "continuity" indicates that the session or the service is not interrupted, or that an interruption is short enough that a user is not aware of such interruption, or that the interruption does not cause any loss of data, or that the loss is handled in acceptable manner (e.g. a few packets of speech lost, but the conversation can continue, etc.).

The term "availability" or "service availability" refers to a level of the service, or a characteristic of the service, in which the service provider should provide the service, albeit possible hardware or software faults. For example, the service provider may obligate to the customer to provide a particular level of processing power, communication features such as bandwidth, latency, and jitter, database consistency, etc. Such level or characteristic of the service should be available to the customer even when a hardware component or a software component providing the service do not function properly. Providing availability may therefore require additional resources such as backup resources and/or mirroring. Hence "availability" may also refer to the terms "fault recovery" and "redundancy".

The term "fault recovery" refers to the process of recovering one or more of the network's services, functions, and features after a fault, whether caused by a hardware malfunction, a system crash, a software bug or a security breech or fault. A hardware malfunction includes, but is not limited to, any type of inadequate performance associated with, for example, power supply, processing units, memory, storage, transmission line, etc. The term "fault recovery" also applies to recovering the functionality of one or more VNFs or VNF instances with respect to any of the above. The terms security breech or security fault may be used interchangeably.

The term "redundancy" refers to any type of component of the network that is fully or partly duplicated, provided in standby mode, or otherwise available, to replace another component of the network when that other component stops functioning properly or otherwise indicates some kind of fault. Redundancy may apply, but is not limited to, hardware, software, data and/or content.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

The present embodiments comprise a system, method, and computer program product for preserving service continuity in a communication network using network function virtualization (NFV), and, more particularly, but not exclusively to managing the migration of a virtual network function (VNF) in NFV-based communication networks while preserving service continuity.

The principles and operation of a system, method, and computer program product for preserving service continuity in an NFV-based network according to embodiments of the present invention may be better understood with reference to the following drawings and accompanying description.

It is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

In the context of this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text, has the same use and description as in the previous drawings where it was described.

The drawings associated with this document may not be to any scale. Different figures may use different scales and different scales can be used even within the same drawing, for example different scales for different views of the same object or different scales for the two adjacent objects.

The purpose of embodiments of the present invention is to provide service continuity while migrating VNFs in an NFV-based network. Migration of VNFs applies to several operations carried in a communication network, such as network optimization, preventive maintenance, and product replacement. In the case of network optimization, a VNF is moved (migrated) from a first computing facility to a second computing facility to improve the overall network performance. In the case of preventive maintenance, a VNF is moved (migrated) from a first computing facility to a backup computing facility to enable maintenance activity in the first computing facility. In the case of product replacement, the functionality of a VNF is moved (migrated) from a first VNF instance using the replaced product to a second VNF instance using the replacing product.

The term computing facility relates to any type of computing device, including, but not limited to, a processing device, a memory device, a storage device, and/or a communication device, including cloud-based infrastructure. A product replacement may refer to products from different vendors, different products from the same vendor, different releases of the same product, product upgrades, etc.

A method, system, and computer program product for providing service continuity while migrating VNFs in an NFV-based network is described herein in terms of a method and a system for automating preventive maintenance in NFV-based communication networks. It is appreciated that providing service continuity while migrating VNFs in an NFV-based network in other cases such as network optimization and product replacement is performed using a similar method and system, etc.

Preventive maintenance applies to any action or activity performed in the network in anticipation of an adverse event, effect or situation. The preventive maintenance prevents the occurrence of such event, effect or situation or any possible degradation of the network performance. Except for preventing unexpected degradation of the network performance, preventive maintenance is considered less costly than fault maintenance. Network Function Virtualization creates a network much more dynamic than a legacy communication network. Network functions are installed, removed, and moved between hardware facilities much more frequently, and thus, managing preventive maintenance becomes more difficult on one hand, and more critical on the other hand.

Lifecycle management or workflow refers to a series of actions executed with regards to a particular virtual network function or feature, or a group of VNFs, such as, for example, a group of VNFs comprising a service, or a component of a service. Such actions may be, for example, onboarding the VNF, provisioning the VNF, scaling the VNF, preventive maintenance, fault maintenance, tearing the VNF, and deboarding of the VNF (discontinuation).

One purpose of lifecycle management is to schedule and execute preventive maintenance activities without affecting the rendered services. Actions or activities of preventive maintenance are typically scheduled ahead of the anticipated event to enable graceful tearing of services while maintaining session continuity. Preventive maintenance activities are costly and therefore their frequency should be reduced to the minimum. Preventive maintenance activities require network resources, and thus may have adverse effect on the network performance. Therefore, the preventive maintenance activities should be scheduled to periods of low load on the relevant resources. Such periods should make available the required resources for the load and time as required by the particular preventive maintenance activity.

Preventive maintenance refers to hardware and software and the effect between them. For example, the rate of hardware aging (namely, the probability of a hardware fault due to usage) may depend on the type of software and the activity. As a hardware component may be associated with several software components, and various number of instances (processes) of the same type of software, and vice versa, there is an intricate relationship between hardware and software. In an NFV-based network this relationship changes continuously.

Therefore, preventive maintenance activities are typically performed according to the statistical data collected and analyzed for the hardware components, and in an NFV-based network also for any virtual network function/feature (VNF) and any instance of network virtualization function.

Lifecycle management in NFV environment is different from lifecycle management in legacy networks due to the flexibility of the NFV environment in allocating VNFs to processing resources. Therefore, lifecycle management in a legacy network is quite stable over time, while lifecycle management in NFV environment is changing with the activation of every VNF instance. A method for continuous adaptation of the lifecycle plan to the changing NFV environment is therefore required.

Figure 2:
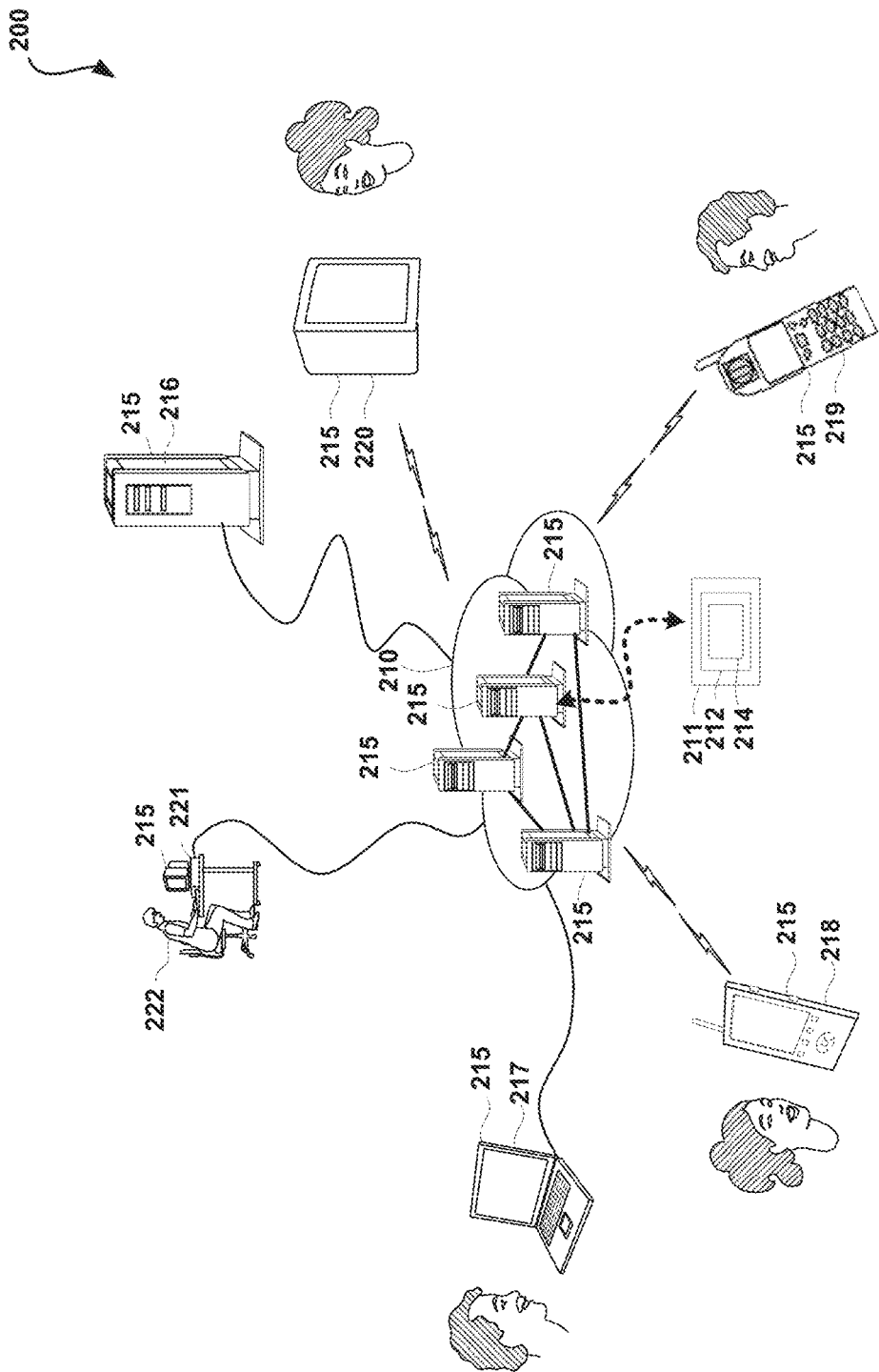
FIG. 2 illustrates a simplified diagram of a system associated with an NFV-based communication network, in accordance with one embodiment.

FIG. 2 illustrates a simplified diagram of a system 200 associated with an NFV-based communication network 210, in accordance with one embodiment. As an option, the system 200 may be implemented in the context of the details of FIG. 1. Of course, however, system 200 may be implemented in the context of any desired environment. Further, the aforementioned definitions may equally apply to the description below.

As shown in FIG. 2, at least one NFV-based network 210 is provided. The NFV-based communication network 210 includes an NFV management system 2111, an NFV-orchestration (NFV-O) module 212, and a preventive maintenance module 213, according to one embodiment.

In the context of the present network architecture, the NFV-based network 210 may take any form including, but not limited to a telecommunications network, a local area network (LAN), a wireless network, a wide area network (WAN) such as the Internet, peer-to-peer network, cable network, etc. While only one network is shown, it should be understood that two or more similar or different NFV-based networks 210 may be provided.

The NFV-based network 210 may include one or more computation facilities 214, each including one or more hardware units and being interconnected by communication links to form the NFV-based network 210. At least one of the computation facilities 214 may include the NFV management system 211. The NFV management system 211 may include the NFV-O module 212 and the preventive maintenance module 213.

The NFV-O module 212 may be executed by one or more processors, or servers, such as computation facilities 214, of the NFV-based network 210. The NFV-O module 212 may be executed as an NFV-O instance or component. The NFV-O module 212 may therefore include a plurality of NFV-O instances or components as will be further explained below.

The preventive maintenance module 213 may be a part or a component of the NFV-O module 212. However, the preventive maintenance module 213, the NFV-O module 212 and the NFV management system 211 may be separate software programs provided by different vendors. In one embodiment, the NFV-based network 210 may even have a plurality of any of the NFV management systems 211, the NFV-O modules 212, and/or the preventive maintenance module 213.

A plurality of devices 215 are communicatively coupled to the NFV-based network 210. For example, a server computer 216 and a computer or terminal 217 may be coupled to the NFV-based network 210 for communication purposes. Such end-user computer or terminal 217 may include a desktop computer, a lap-top computer, a tablet computer, and/or any other type of logic or data processing device. Still yet, various other devices may be coupled to the NFV-based network 210 including a personal digital assistant (PDA) device 218, a mobile phone device 219, a television 220 (e.g. cable, aerial, mobile, or satellite television, etc.)2, etc. These devices 215 may be owned and/or operated by end-users, subscribers and/or customers of the NFV-based network 210. Others of the devices 215, such as administration station 221, may be owned and/or operated by the operator of the NFV-based network 210.

A network administrator 222 may supervise at least some aspects of the operation of the NFV-based network 210 by controlling an NFV infrastructure including the NFV management system 211, the NFV-O 212, and the preventive maintenance module 213.

Figure 3:
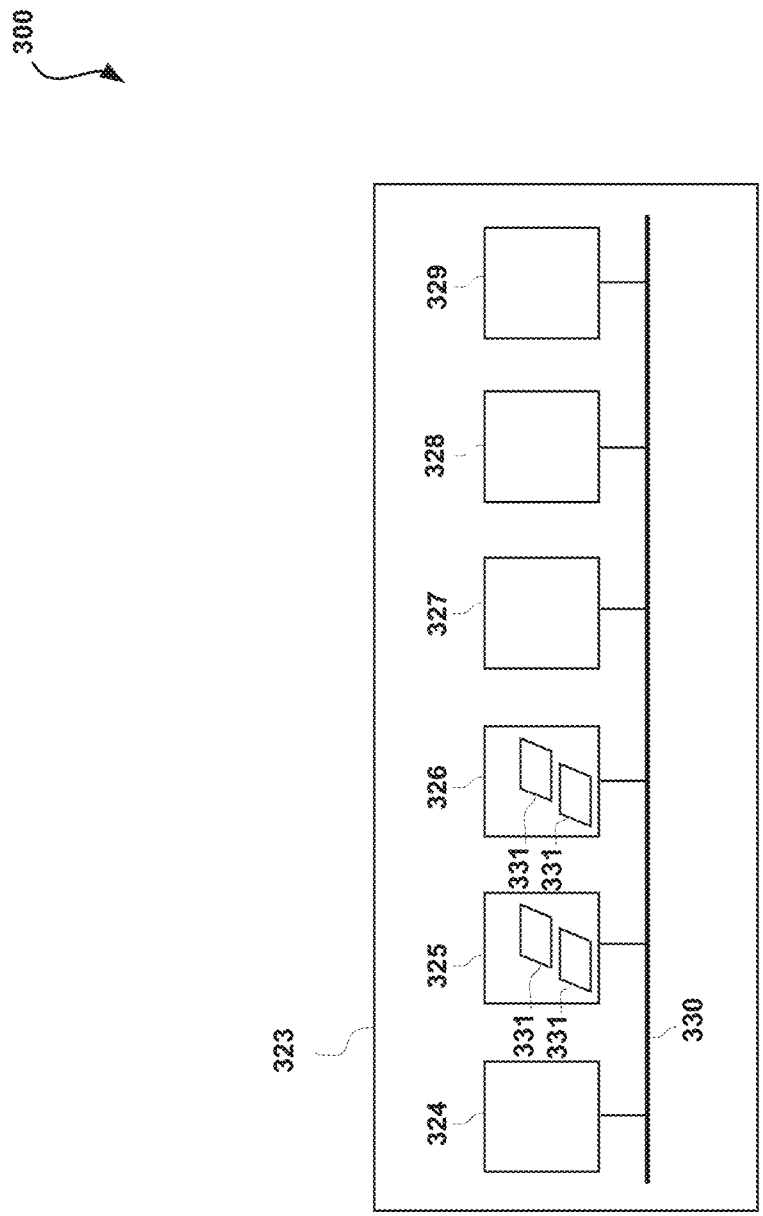
FIG. 3 illustrates a simplified block diagram of a hardware unit of an NFV-based network, in accordance with one embodiment.

FIG. 3 illustrates a simplified block diagram 300 of a hardware unit 323 of an NFV-based network, in accordance with one embodiment. As an option, the block diagram 300 may be viewed in the context of the details of the previous Figures. Of course, however, block diagram 300 may be viewed in the context of any desired environment. Further, the aforementioned definitions may equally apply to the description below.

In one embodiment, the hardware unit 323 may represent a computing facility 214 of FIG. 2, or a part of a computing facility 214. The hardware unit 323 may include a computing machine. The term computing machine relates to any type or combination of computing devices, or computing-related units, including, but not limited to, a processing device, a memory device, a storage device, and/or a communication device.

The hardware unit 323 may therefore be a network server, and the computing facility 214 may be a plurality of network servers, or a data-center, including cloud-based infrastructure. As an option, the hardware unit 323 may be implemented in the context of any of the devices of the NFV-based network 210 of FIG. 2 and/or FIG. 5 and in any desired communication environment.

Each hardware unit 323 (or computing machine, computing device, computing-related unit, and/or hardware component, etc.), including each communication link between such hardware units, may be associated with one or more performance type and a respective performance rating or value, where the hardware unit and/or communication link is operative to provide the performance value. Performance types are, for example, processing power, cash memory capacity, regular memory capacity (e.g. RAM, dynamic, or volatile memory, etc.), non-volatile memory (e.g. such as flash memory, etc.) capacity, storage capacity, power, cooling, bandwidth, bitrate, latency, jitter, bit error rate, and packet loss, etc. Virtual machines may run on top of the hardware unit 323 and a VNF may be run on one or more of such virtual machines.

The hardware unit 323 may be operative to provide computing infrastructure and resources for any type and/or instance of software component executed within the NFV-based network 210 of FIG. 2. In this regard, the hardware unit 323 may be operative to process any of the processes described herein, including but not limited to, any NFV-related software component and/or process. The hardware unit 323 is operative to process virtual network functions (VNFs), VNF instances, network function virtualization orchestration (NFV-O) software, modules and functions, data center management software, and/or cloud management systems (CMS), etc.

In various embodiments, the hardware unit 323 may include at least one processor unit 324, one or more memory units 325 (e.g. random access memory (RAM), a non-volatile memory such as a Flash memory, etc.), one or more storage units 326 (e.g. including a hard disk drive and/or a removable storage drive, representing a floppy disk drive, a magnetic tape drive, a compact disk drive, etc.), one or more communication units 327, one or more graphic processors 328 and displays 329, and one or more communication buses 330 connecting the various units/devices.

The hardware unit 323 may also include one or more computer programs 331, or computer control logic algorithms, which may be stored in any of the memory units 325 and/or storage units 326. Such computer programs, when executed, enable the hardware unit 323 to perform various functions (e.g. as set forth in the context of FIG. 1, etc.). The memory units 325 and/or the storage units 326 and/or any other storage are possible examples of tangible computer-readable media.

It is appreciated that computer program 331 may include any of the NFV management system 211, the NFV-O 212, and/or the preventive maintenance module 213 of FIG. 2.

Figure 4:
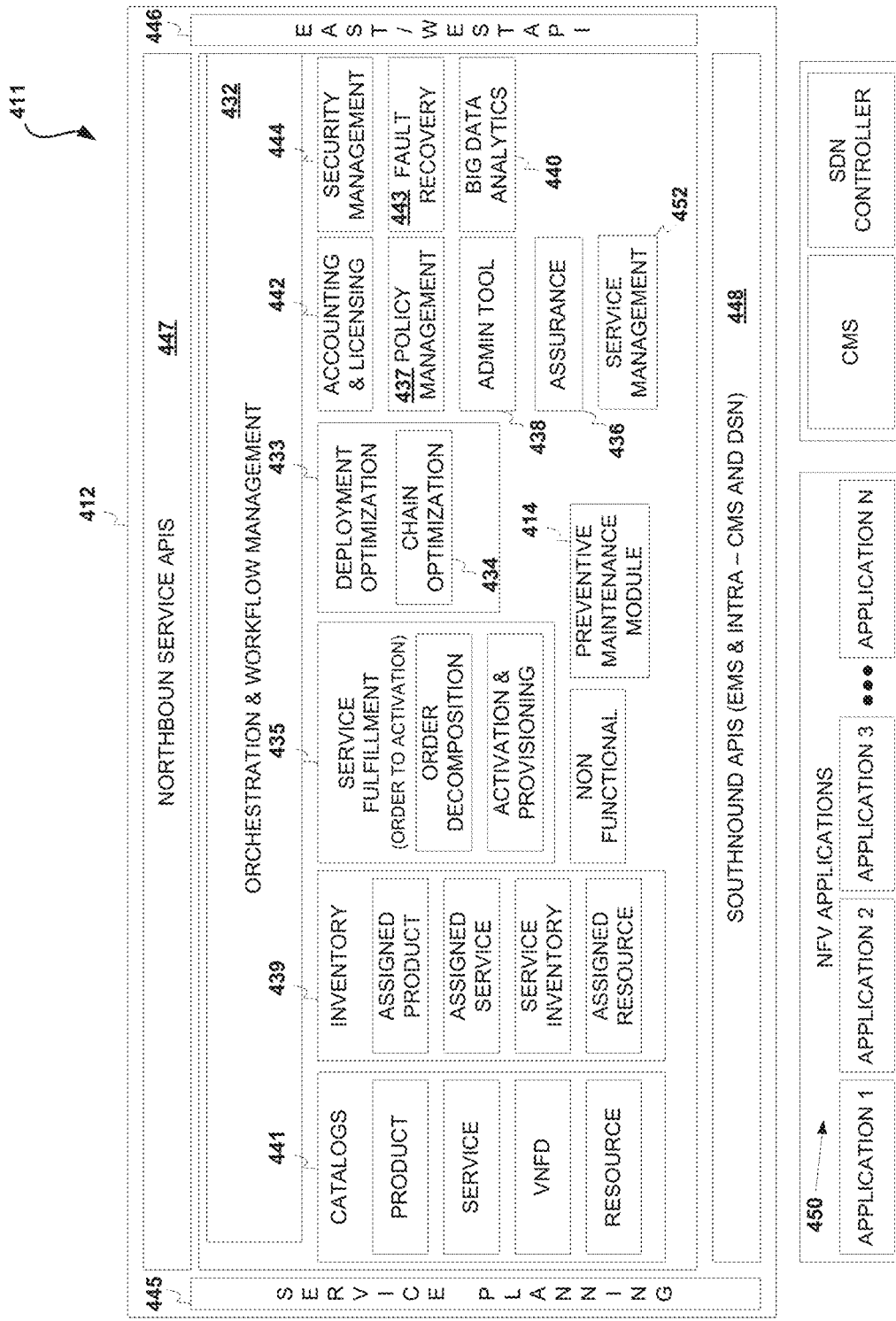
FIG. 4 illustrates a simplified diagram of an NFV management system, in accordance with one embodiment.

FIG. 4 illustrates a simplified diagram of an NFV management system 411, in accordance with one embodiment. As an option, the NFV management system 411 may be implemented in the context of the details of the previous Figures. For example, in one embodiment, the NFV management system 411 may represent the NFV management system 211 of FIG. 2. Of course, however, the NFV management system 411 may be implemented in the context of any desired environment. Further, the aforementioned definitions may equally apply to the description below.

In one embodiment, the NFV management system 411 may include an NFV-O module 412, and a preventive maintenance module 413. In one embodiment, the NFV-O module 412 and the preventive maintenance module 413 may represent the NFV-O module 212 and the preventive maintenance module 213 of FIG. 2, respectively. The NFV management system 411 may include one or more NFV-O modules 412. In various embodiments, each of the NFV-O modules 412 may include orchestration and workflow management 432 that is responsible for managing (i.e. orchestrating) and executing all NFV-O processes, including inbound and/or outbound communication and interfaces.

The NFV management system 411 may include a deployment optimization module 433 that enables a user to devise automatic mechanisms for network optimizations. The deployment optimization module 433 may operate these mechanisms automatically and continuously to optimize the distribution of VNFs 450 and their VNF instances in real-time (or near-real-time) by migrating VNFs 450 and VNF instances (e.g. VNF instances 551 of FIG. 5, etc.) between hardware units (e.g. hardware units 551 of FIG. 5, etc.).

The NFV management system 411 may also include a chain optimization module 434. The chain optimization module 434 may be a part of deployment optimization module 433 and may enable a user to devise automatic mechanisms for optimizing the deployment of chains or groups of VNFs 450 and VNF instances. A service provided by an NFV-based network is typically made of a particular chain or group of particular VNFs 450 and their respective VNF instances. The chain optimization module 434 optimizes the deployment of chains or groups of services between hardware units according to the requirements and specifications associated with and/or adapted to the particular service, or chain, or a group.

The chain optimization module 434 may operate these mechanisms automatically and continuously to optimize in real-time the operation of chains or groups of the VNFs 450 and their VNF instances by re-planning their distribution among hardware units and optionally also by migrating the VNFs 450 and associated VNF instances between hardware units.

The NFV management system 411 may also include a service fulfillment module 435 that manages service and resource (e.g. VNF) instance lifecycle activities as part of the process and orchestration activities. This may include on boarding, initiation (e.g. instantiation), installation and configuration, scaling, termination, software update (e.g. of a running VNF, etc.), test environment, and/or rollback procedure. Additionally, the service fulfillment module 435 may also provide decomposition of an order to multiple network services, and the activation of such network service as a single VNF instance, or as a chain of VNF instances.

Order decomposition includes translating business orders into a network oriented service implementation plan. For example, a business order may be decomposed into a plurality of functions, some of which may be provided by different software programs or modules (e.g. such as various VNFs) instantiated as a plurality of VNF instances across one or more data centers. Performing order decomposition, the service fulfillment module 435 may consult the deployment optimization module 433 for the best deployment option to customer order in a given network and resource condition. Performing order decomposition, the service fulfillment module 435 may then initiate the service including all its components. Order decomposition may be performed in several locations across an NFV-O hierarchy. For example, initial decomposition may be performed in the root of the NFV-O, and then further decomposition may be performed in the relevant data centers.

In one embodiment, an activation and provisioning module may provide the plan for activation and provisioning of the service to the orchestration and workflow management 432. The activation and provisioning module may also provide feedback on fulfillment status to an upper layer. This upper layer may include the business support services (BSS).

The NFV management system 411 may also include an assurance module 436 and a service management module 452 capable of gathering real time data on network elements' status and creating a consolidated view of services and network health. The assurance module 436 includes assurance functionality and may interact with the service management module 452 to perform assurance related lifecycle management procedures. Lifecycle management can be also triggered by other modules, policies, manual intervention, or from the VNFs themselves, etc. The assurance module 436 and the service management module 452 may also trigger events associated with lifecycle management and faults. The assurance module 436 and the service management module 452 may monitor the health of the network and may execute fault recovery activities.

The assurance module 436 and the service management module 452 provide the ability to monitor services' status and performance according to the required criteria. The assurance module 436 and the service management module 452 may also interact with the network infrastructure (e.g. including computing, storage, and networking, etc.) to receive the required information, analyze the information, and act upon each incident according to the defined policy. The assurance module 436 and the service management module 452 are able to interact with analytics to enrich a policy assurance module. Interfaces may also be provided for implementation by an external system.

The NFV management system 411 may also include a policy management module 437 that enables a user to define and configure offline and/or real-time policy for controlling VNF and service related rules. The policy management module 437 may contain the preconfigured policies and activities as well as selection rules for the NFV-O process to determine the preferred policy or activity to be performed for a particular process event. The policy management may be multi-layered, including vendor policy, service policy, and operator policy, etc. The policy mechanism may trigger the suitable policy layer (vendor/service/operator).

The NFV management system 411 may also include an administration module 438 that provides an overall view of the network, manual lifecycle management and intervention, and manual system administration and configuration. The administration module 438 may be operable to enable a user such as an administrator (e.g. administrator 222 of FIG. 2, etc.) to manage, view, and operate the NFV-O system. The administration module 438 may also provide a view of the network topology and services, the ability to perform specific activities such as manual lifecycle management, and changing service and connectivity configuration.

The NFV management system 411 may also include an inventory management module 439 that maintains a distributed view of deployed services and hardware resources. Inventory catalogues may reflect the current instantiation and allocation of the resources and services within the network mapped into products and/or customer entities.

The NFV management system 411 may also include a big data analytics module 440 that analyzes network and service data to support network decisions involving services and subscribers to improve network performance based on actual usage patterns. The big data analytics module 440 may also generate what-if scenarios to support business-oriented planning processes. Additionally, the big data analytics module 440 may function to analyze and evaluate the information for various planning aspects (e.g. Virtual Network Capacity Planning, Data Center Capacity Planning, Value based planning, Cost analysis for network deployment alternatives, etc.), deployment and management (e.g. Guided Operator Recommendations. What-if scenario analysis and simulation, application rapid elasticity and resource usage optimization, etc.), and may support business-oriented planning processes.

The NFV management system 411 may also include a catalog module 441 may include records defining various aspects of the network, such as products, services, and resources such as hardware units and VNFs (e.g. a VNF directory, etc.). The catalog module 441 may include a collection of centralized, hierarchical information repositories containing resource, service and product definitions with their relationship, versioning, and/or descriptors, etc. Such records may include templates enabling a user, such as an administrator, to define particular network components such as resources, products, services, etc. A resource template may define resources descriptors, attributes, activities, procedures, and/or connectivity, etc. A service template may define a service variation from resource building blocks. A product template may define parameters of a sellable product (e.g. prices, rating, etc.) based on service composition (e.g. in one embodiment, this may be part of a BSS catalogue).

The inventory management module 439, the big data analytics module 440, and/or the catalog module 441 may support multiple data centers, multiple CMSs and provide a centralized view across the infrastructure. The inventory management module 439, the big data analytics module 440, and/or the catalog module 441 may also support hybrid networks and services maintaining both physical and virtual resources.

The NFV management system 411 may also include an accounting and licensing module 442 that may be operable to record and manage network software usage data for commercial purposes including licensing, accounting, billing, and reconciliation of services with subscribers and providers. The accounting and licensing module 442 may manage licensing and usage of virtual network applications, including the ability to support complex rating schemes, based on various parameters such as CPU, memory, data, etc. The accounting and licensing module 442 may enable users to define the pricing of particular VNF modules and provide settlement with vendors. The accounting and licensing module 442 may also enable the evaluation of internal costs of services provided within the network for calculating return on investment (ROI).

The NFV management system 411 may also include a fault recovery module 443 (otherwise named disaster recovery planning module or DRP, etc.) that enables a user to plan and manage disaster recovery procedures for the NFV-O and/or the entire network.

The NFV management system 411 may also include a security management module 444 that provides the authentication authorization and accounting services of application security across the network. The security management module 444 may include, for example, an authentication module and function. In one embodiment, the authentication module and function (e.g. including identity management, etc.) may authenticate the identity of each user defined in the system. Each user may have a unique user identity and password. The system may support password based authentication with flexible password policy. Integration with external authentication providers may be done via additional system enhancements. The authorization module and function may support a role-based access control (RBAC) mechanism, where each user is assigned with one or more roles according to the business needs based on the least privileges concept (e.g. standard or administrator roles). In one embodiment, the accounting and licensing module 442 may provide an audit of security events such as authentication or login events.

As an option, the security management module 444 may use rules to protect sensitive information. For example, such rules may be used to ensure the data accessed is used for the specific purposes for which it was collected, sensitive information is encrypted when in storage/transit and masked/truncated on display and logs, and that the entire security system is deployed in the customer's intranet network (i.e. behind network/infrastructure measures), in an independent domain, etc.

In one embodiment, the NFV management system 411 may further include a Secure Development Life Cycle (SDLC) module that ensures that security aspects are handled during a project's life cycle, such as security design, security testing, etc.

As shown further in FIG. 4, the NFV management system 411 may include a service planning module 445. The service planning module 445 may be used by a communication service provider (CSP) sales representative, enterprise, and/or technician, as part of selling engagement process with enterprise/SMB customers.

The service planning module 445 may also provide the ability to interact with catalogues, customer data, network and ordering systems to provide online network service proposals for the enterprise customers with ability to quote update the proposal, validate the serviceability and network inventory, and once done, provide the service order for activation using the northbound interface.

The preventive maintenance module 413 may also be part of the NFV-O module 412. The preventive maintenance module 413 may be operable to: identify a first VNF instance associated with a first VNF in a first hardware unit; initiate a second VNF instance on a second hardware unit, the second VNF instance being compatible with the first VNF instance; and divert communication directed to the first VNF instance to the second VNF instance on the second hardware unit, in response to initiating the second VNF instance on the second hardware unit.

Additionally, the preventive maintenance module 413 may be operable to: identify a first potential fault in a first resource; identify a first time for maintaining the first resource to prevent an occurrence of the first potential fault; and identify a second resource for replacing the first resource during the first time. Moreover, the preventive maintenance module 413 may implement functionality described in the context of FIG. 1, etc.

The preventive maintenance module 413 or the NFV-O module 412 may be operable to preserve service continuity when migrating a VNF (or a group of VNFs, or a service) between hardware units, and/or when migrating a VNF functionality (or the functionality of a group of VNFs, or a service) between different VNFs (e.g. between VNF(s) of different VNF vendors).

The NFV management system 411 may also include east/west APIs 446 that include various domains/activities interfaces, including an information source to a big data repository, and interaction capability with a physical network system (OSS).

Northbound APIs 447 provides application programming interfaces (APIs) to various external software packages, such as business support system (BSS) for service order fulfillment, cancel and update activities, status notification, resource inventory view, monitoring system, assurance system, service planning tool, administration tool for system view and configuration, and big data repository, etc.

Further, the southbound APIs 448 may provide APIs for external software packages, such as CMS (including service and VNFs lifecycle activities—receiving from the infrastructure status and monitoring information for upstream system and activities [e.g. assurance]), an SDN Controller (or other connectivity system) to configure inter and intra data center connectivity, an EMS to configure the VNF, and a VNF for a direct configuration.

Figure 5:
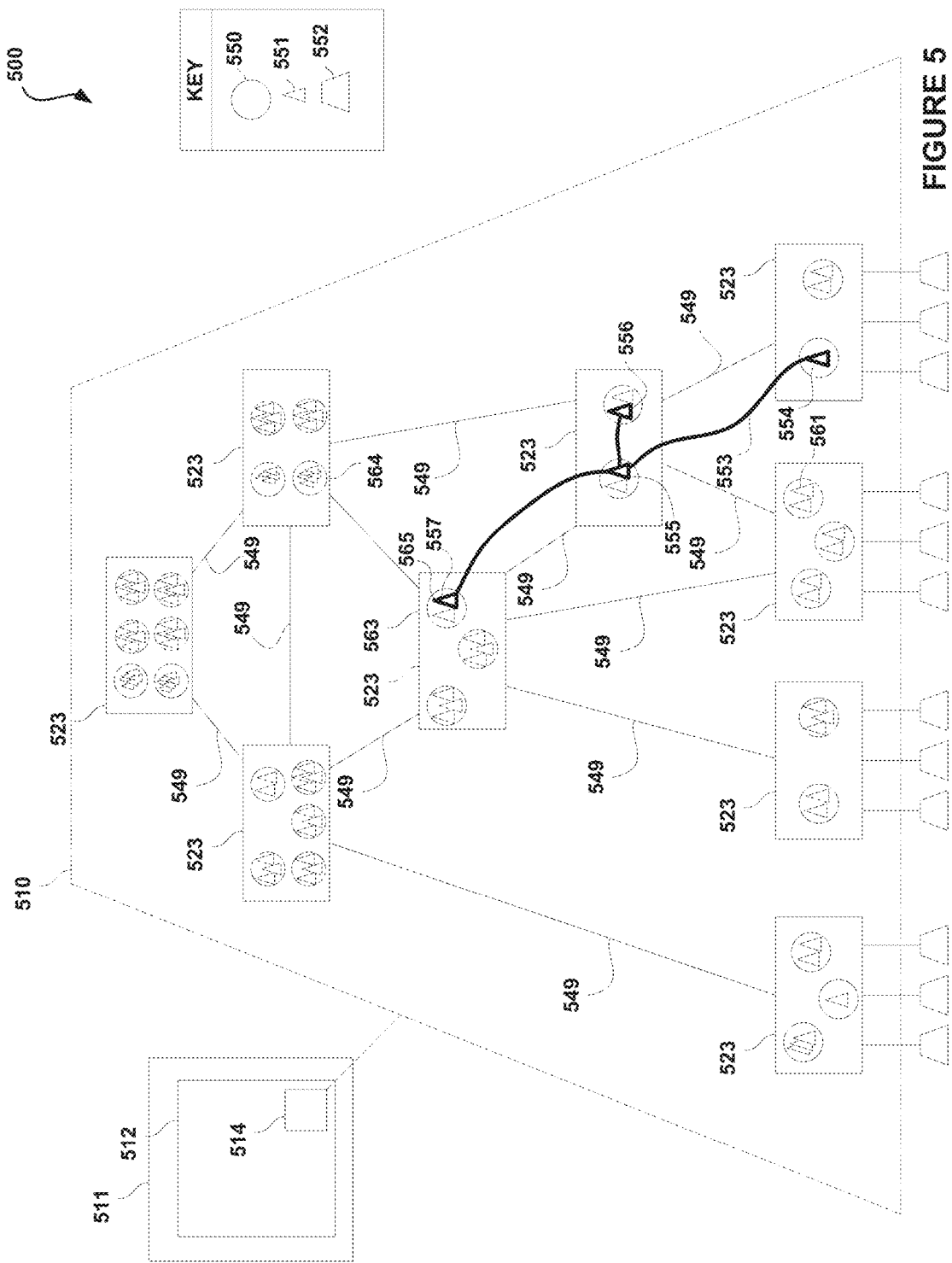
FIG. 5 illustrates a simplified diagram of a deployed NFV-based network, in accordance with one embodiment.

FIG. 5 illustrates a simplified diagram 500 of a deployed NFV-based network 510, in accordance with one embodiment. As an option, the diagram 500 may be viewed in the context of the details of the previous Figures. For example, in one embodiment, the deployed NFV-based network 510 and associated elements may represent the NFV-based networks and associated elements described in the context of the previous Figures. Of course, however, the diagram 500 may be viewed in the context of any desired environment. Further, the aforementioned definitions may equally apply to the description below.

As shown in FIG. 5, the NFV-based network 510 may include hardware units 523 connected via transmission lines 549, and VNFs implemented as software programs 550 installed in hardware units 523. Some of the hardware units 523 may be directly connected to a customer. The customer may be a subscriber, an end-user, or an organization, represented herein as a terminal or a server 552, or a plurality of terminals and/or servers 552. The NFV-based network 510 may also include an NFV management system 511, an NFV-orchestration (NFV-O) 512, and a preventive maintenance module 513 (which may all represent elements described in the context of the previous figures, etc.).

As shown further in FIG. 5, several, typically different, VNFs 550 may be installed in the same hardware unit 523. Additionally, the same VNF 550 may be installed in different hardware units 523.

A VNF 550 may be executed by a processor of the hardware unit 523 in the form of a VNF instance 551. Therefore, a particular VNF 550 installed in a particular hardware unit 523 may be "incarnated" in (e.g. initiated, executed as, etc.) any number of VNF instances 551. The VNF instances 551 may be independent of each other. Additionally, each VNF instance 551 may serve different terminals and/or servers 552. The NFV-based network 510 connects to and between communication terminal devices 552 that may be operated by one or more customers, subscribers, and/or end-users.

It is appreciated that a network operator may manage one or more services deployed in the customer's premises. Therefore, some of the hardware units 523 may reside within the premises of the network operator, while other hardware units 523 may reside in the customer's premises. Similarly, a server, such as server computer 216 of FIG. 2, may reside in the premises of the network operator or in the customer's premises. Consequently, when the network operator provides and/or manages one or more services for a customer's terminal devices 552 such as a server computer, the NFV-based network 510 of the network operator may directly manage the VNFs 550, providing the services and their VNF instances 551.

In such situation, the NFV-based network 510 may manage the services irrespectively of the location of the terminal devices 552 (e.g. the server computer 216, etc.), whether in the premises of the network operator or in the customer's premises. In other words, the NFV-based network 510 may be managing the VNFs 550 and the VNF instances 551 providing the services, as well as the terminal devices 552 (e.g. the server computer 216, etc.) being co-located within the same computing device (e.g. the hardware unit 523, etc.), whether in the premises of the network operator or in the customer's premises or in a commercial cloud or any other place.

A service provided by the communication network may be implemented using one or more VNFs. For example, the service may be a group, or a chain of interconnected VNFs. The VNFs making the group, or the service, may be installed and executed by a single processor, by several processors on the same rack, within several racks in the same data-center, or by processors distributed within two or more data-centers. In some cases, chain optimization may be employed by optimizing the deployment of a service in a communication network using network function virtualization, and to optimizing the deployment of a group, or a chain, of virtual network functions in the NFV-based network 510. Therefore, the term "chain optimization" refers to the planning and/or managing of the deployment of VNFs making a chain, or a group, of VNFs providing a particular service.

For example, FIG. 5 shows a first service 553, including the VNFs 550 and their respective VNF instances 554, 555, 556, and 557, and a thick line. In this example, the group or chain of the VNFs 550 making first service 553 are connected as a chain of VNFs 550. However, the VNFs 550 making a service may be connected in any conceivable form such as a star, tree-root, tree-branch, mesh, etc., including combinations thereof. It is noted that the VNFs 550 may be executed by two or more VNF instances 551, such as VNF 554.

The deployment of the group or chain of the VNFs 550 making the first service 553 is therefore limited by constraints such as the capacity of the communication link 549 bandwidth and/or latency (delay).

A VNF may have a list of requirements, or specifications, such as processing power, cash memory capacity, regular memory capacity (e.g. RAM, dynamic, or volatile memory, etc.), non-volatile memory (e.g. such as flash memory, etc.) capacity, storage capacity, power requirements, cooling requirements, etc. A particular VNF instance 551 providing a particular function (e.g. to a particular customer, entity, etc.) may have further requirements, or modified requirements, for example, associated with a particular quality of service (QoS) or service level agreement (SLA). Such requirements may include maximum latency or delay, average latency and maximum variance (latency jitter), maximal allowed packet loss, etc. Other requirements may include service availability, redundancy, backup, provisions for rollback and/or recovery, fault-tolerance, and/or fail-safe operation, etc.

A service made of a chain or a group of VNFs 550 and their VNF instances 551 may have a similar list of requirements, or specifications, covering the service as a whole.

Therefore, such requirements, or specifications, may imply, affect, or include, requirements, or specifications, regarding communication links between the VNFs 550 and/or the VNF instances 551. Such requirements, or specifications, may include bandwidth, latency, bit-error rate, and/or packet loss, etc. Such communication requirements or specifications may further impose deployment limitations, or constraints, requiring particular VNFs 550 and/or VNF instances 551 to reside in the same data-center, or within the same rack, or even in the same computing device, for example, sharing memory or being executed by the same processor. Security measures may add further requirements, or specifications, such as co-location of some of the VNFs 550 and/or the VNF instances 551.

In the context of FIG. 5, the NFV-based network 510 has a hierarchical structure. There may be at least four aspects of the hierarchical structure of the NFV-based network 510. The networking or traffic aspect refers to the arrangement of the transmission lines between the hardware units 523. The processing aspect refers to the arrangement of the hardware units 523. The software aspect refers to the arrangement of the VNFs 550. The operational aspect refers to the arrangement of the VNF instances 551.

One aspect of the optimization process in an NFV-based network is that it may be based on real-time needs, rather than long-term, statistically anticipated, needs. One potential limitation on network reconfiguration in NFV-based networks is that network configuration does not result in a deterioration beyond acceptable level of any of the current services. The NFV deployment module (e.g. module 433 of FIG. 4, etc.) may function to enable and manage migration of services between the hardware units 523, the VNFs 550, and the VNF instances 551 in real-time, without affecting or with a minimal effect on the availability of a service, and while securing service and session continuity.

In the context of the current description, the term "continuous" means that the deployment optimization module and/or a chain optimization module (e.g. the chain optimization module 434 of FIG. 4, etc.) performs the relevant optimization task or process in run-time, or real-time, or online, or on-the-fly, or repetitively and without adversely affecting the network's functionality and its services.

Unlike a legacy network, the NFV-based network may have two topologies: the topology of the hardware devices, and the topology of the VNFs (the distribution of VNFs among the hardware devices). The topology of the hardware network is relatively stable, while the VNF topology can be optimized in real-time. Another benefit of the NFV-based network is that modifying the software topology (e.g. the distribution of VNFs among the hardware devices) is much less costly than any modification of the hardware topology. However, any modification of the network has its cost, including the cost of making such modification possible. Added cost may result from the need to process the modification of the topology and the re-distribution of VNF instances and to maintain excess resources for such purpose.

Thus, in some cases, it may be desired to localize the NFV-O 512, and particularly the deployment optimization processes associated with the deployment optimization module and the chain optimization module to reduce the cost, and simultaneously to secure the possibility to expand the scope of the network managed by these processes, if needed.

Figure 6:
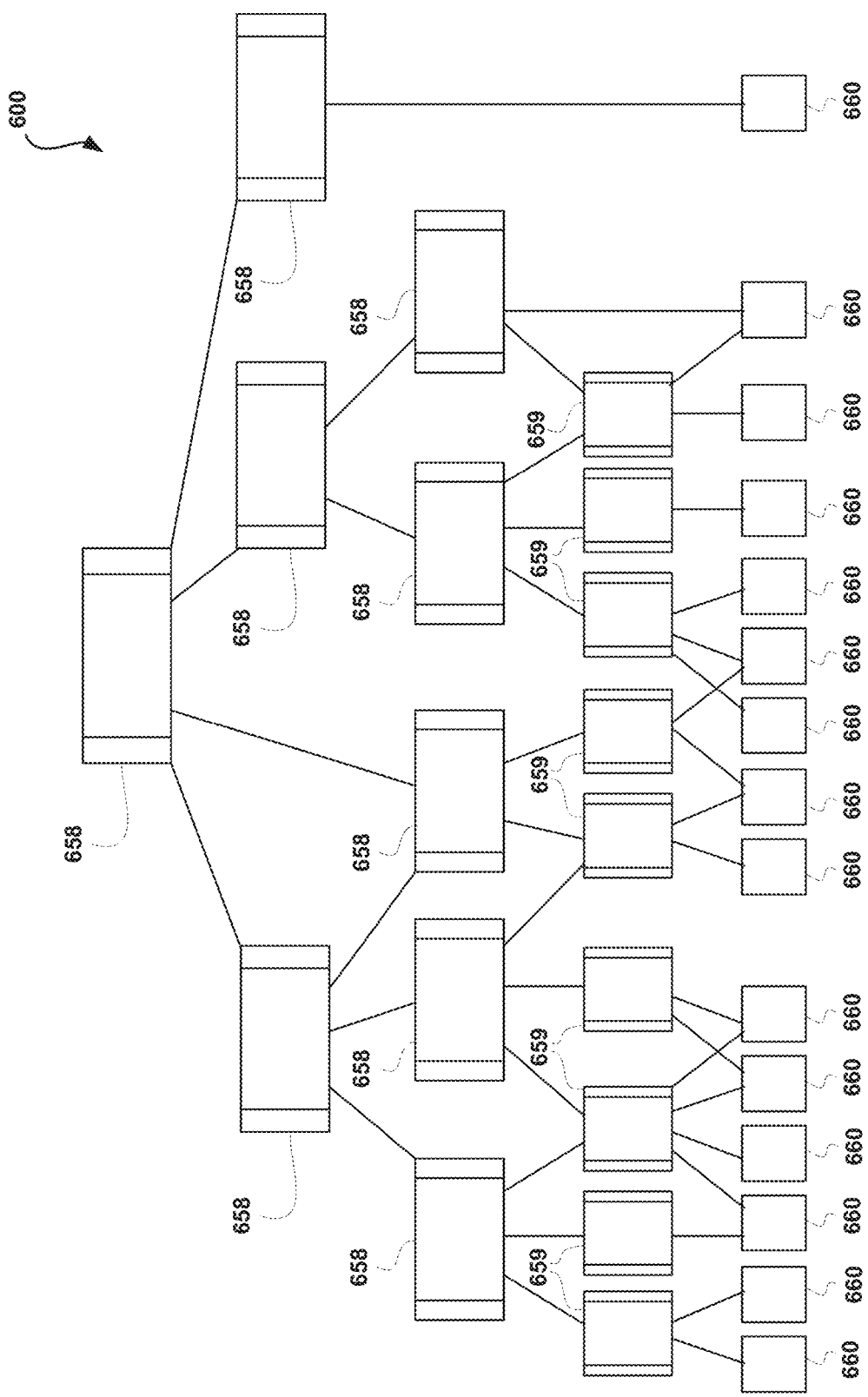
FIG. 6 illustrates a simplified diagram of a distributed deployment of an NFV-MANO (Management and Orchestration), in accordance with one embodiment.

FIG. 6 illustrates a simplified diagram 600 of a distributed deployment of an NFV-O, in accordance with one embodiment. As an option, the diagram 600 may be viewed in the context of the details of the previous Figures. For example, in one embodiment, the distributed deployment of the NFV-O may represent the NFV-based networks and associated elements described in the context of the previous Figures. Of course, however, the diagram 600 may be viewed in the context of any desired environment. Further, the aforementioned definitions may equally apply to the description below.

The distributed architecture of an NFV-O enables faster response to local events on one hand, and improved scalability on the other hand. In a distributed NFV-O architecture, decision processes are performed in self-contained and local decision points, closer to the customer, and closer to the events (e.g. such as network or security faults, etc.).

The hierarchy of a distributed NFV-O can be viewed as a tree of two component types: a core component 658 and a leaf component 659. The NFV-O core component 658 can be a child of another core component 658, and/or a parent of one or more core components 658 or leaf components 659. A leaf component 659 cannot be a parent of a core component 658 or a leaf component 659.

Orchestration parameters managed by a particular leaf component 659 or core component 658 may be reported in real-time to the supervising (parent) core component 658. In addition to the supervision, this continuous updating process enables the supervising component to provide backup, and/ or support recovery processes associated with hardware and/or software faults as well as security faults and/or breeches.

To provide redundancy, a leaf component 659 may be supervised by two or more core components 658, and child core components 658 may be supervised by two or more parent core components 658. The orchestration parameters managed by a particular core component 658 or leaf component 659 may also be mirrored to the backup core components 658. Optionally, the NFV-O core components 658 may have the same fully functional orchestration capabilities, while leaf components may be limited to simple, well defined and localized sub-orchestration tasks, and thus may provide a faster response to demands and changing load.

A cloud management system (CMS) 660 is a software package managing one or more hardware units operating one or more VNFs and executing one or more VNF instances. A CMS 660 can be managed by one or more leaf components 659 or core components 658, or combinations thereof. A CMS 660 can be located in the operator's premises or in the customer's premises or partly in both.

An NFV-O component such as a core components 658 or a leaf component 659 typically orchestrates a particular, predefined, territory. The territory may be one or more cloud management systems 660, one or more services, one or more customers, etc. Therefore, there can be an overlap between territories of different NFV-O components. For example, one NFV-O component may orchestrate a CMS 660, another NFV-O component may orchestrate a service that is at least partly provided by the same CMS 660, and additionally a third NFV-O component may orchestrate services for a particular customer connected to that same CMS 660.

If, for any reason, the first responder NFV-O component cannot resolve the problem, for example, for lack of adequate or sufficient resources within the territory of the particular NFV-O component, the problem may be escalated above to the supervising or parent NFV-O component.

The NFV-O is a central component of the network as a system and thus may present a risk from a security perspective. For example, an attack against the NFV-O may result in a total network outage. Securing the NFV-O is therefore a goal and a challenge. A distributed NFV-O architecture enhances the network resilience/endurance. When an attack on a particular instance of the NFV-O is detected the NFV-O instance may be isolated and its functionality may be transferred to one or more other NFV-O instances.

Another aspect of the NFV-O hierarchy is stratified granularity, or resolution, of the orchestration process. An NFV-based network may include a very large number of hardware elements (e.g. processors, memory units, storage units, communication links, etc.) and an even larger number of VNFs and VNF-instances. Each of the VNF-instances may have a number of requirements (e.g. such as processing power, memory size, storage size, communication bandwidth, latency and jitter, etc.). Each of these hardware elements and software modules may produce a number of load values (e.g. corresponding to their respective requirements).

All of this creates a large amount of data that should be processed continuously or repeatedly to determine possible adverse conditions (e.g. a particular overload) or a potential cost saving situation. Such situation may require deployment optimization (e.g. the planning of a newly optimized deployment of VNF-instances) and redeployment (e.g. implementing the optimized deployment). The NFV-O hierarchy enables scalability of the redeployment optimization process by distributing the process in a hierarchical manner.

One optional aspect of hierarchical deployment optimization is that higher levels in the NFV-O hierarchy processes deployment optimization in a coarser granularity (or resolution), while lower levels in the NFV-O hierarchy processes deployment optimization in a finer granularity (or resolution).

For example, while a leaf component 659 manages its part (territory) of the NFV-based network in terms of particular hardware elements (e.g. processors, memory units, storage units, communication links, etc.) and software elements (e.g. VNFs and VNF-instances), a core component may manage its part (territory) of the NFV-based network in terms of whole subordinate (child) core components 658 or leaf components 659 it supervises. Thus, such parent core component 658 may perform deployment optimization in terms of requirements and load values applied to whole subordinate (child) core components 658 or leaf components 659.

A customer may use the services of several telecom operators. For example, the customer may be an international company operating in several countries. Such a customer usually establishes a virtual private network (VPN) across this plurality of telecom operators. Considering that these operators now operate NFV-based networks, the customer may establish a service including a plurality of VNFs, where different VNFs are part of different networks. Managing such inter-operator VNF-chains, or services, requires tight coordination across different NFV-based networks.

Such coordination can be implemented using various techniques. For example, the coordination may be implemented by enabling tight coordination between NFV-Os of the different NFV-based networks. As another example, the coordination may be implemented by establishing an inter-network NFV-O module that manages one or more inter-network VNF-chains, or services of a particular customer.

Optionally, such inter-network NFV-O may supervise two or more child or leaf NFV-O modules, each within a particular NFV-based network incorporating an NFV participating in the particular VNF-chain or service. It is appreciated that NFV-Os of different operators may be provided by different NFV-O vendors.

In a first network configuration a single NFV-O module may manage the deployment of VNFs and VNF instances throughout the entire NFV-based network. A deployment optimization module (e.g. and a chain optimization module) of the NFV-O module may continuously investigate the development of loads and provide alternative deployment plans. Consequently, the NFV-O module may redeploy VNFs and VNF instances and reallocate network resources accordingly.

Deployment optimization is indicated when one part of the NFV-based network is over-loaded (or approaches an overload situation) while another part of NFV-based network is relatively idle. The redeployment migrates some of the network entities (e.g. VNFs and VNF instances) from the overloaded part of NFV-based network to the relatively idle part of the NFV-based network to free resources where needed mostly. Therefore, the deployment optimization and redeployment activities may follow the changes of load distribution.

Figure 7:
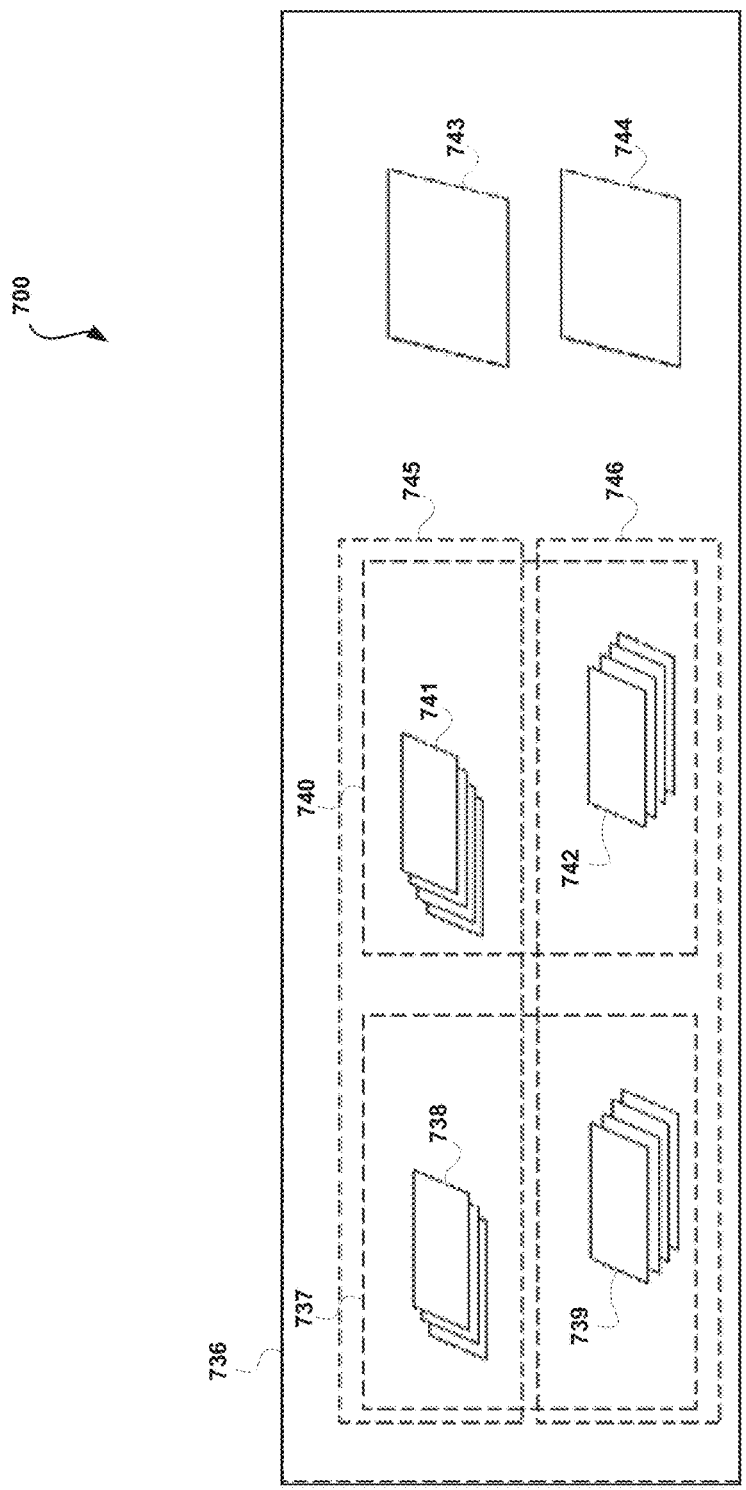
FIG. 7 is a simplified block diagram of a preventive maintenance database in an NFV-based network, in accordance with one embodiment.

FIG. 7 illustrates a simplified diagram 700 of a preventive maintenance database, in accordance with one embodiment. As an option, the diagram 700 may be viewed in the context of the details of the previous Figures. Of course, however, the diagram 700 may be viewed in the context of any desired environment. Further, the aforementioned definitions may equally apply to the description below.

The preventive maintenance database 736 is a data structure including a template database 737, a deployment database 740, a topology database 743, and an activity database 744. The template database 737 includes detailed records of hardware types 738 and software types 739 (i.e. VNF templates). The template database 737, and particularly the VNF templates 739, may be part of a virtual function catalog.

The deployment database 740 includes detailed records of hardware instances 741 (i.e. hardware units actually deployed in the network) and software instances 742 (i.e. VNF instances as deployed in the network).

The topology database 743 defines the topology of the NFV-based network. The topology database 743 may be part of, or interface with, a service view and topology module.

The activity database 744 contains a record for each scheduled activity of preventive maintenance. Every record of the template database 737 includes: a list of all the faults associated with the respective hardware or software (e.g., VNF) component; the fault frequency, or mean time to fault (MTTF, or MTBF (mean time between faults)) for each fault; fault conditions or dependencies, such as the dependency of the MTTF on values such as temperature and humidity (value and period), activation/deactivation, cycles of use, rate of upgrade (such as bug fixes), etc.; preventive maintenance activity required to prevent a particular fault of a particular VNF; and resources associated with a preventive maintenance activity required to prevent a particular fault of a particular VNF (type, quantity and period (Mean Time To Repair—MTTR)).

Every record of the deployment database 740 includes: network requirements (e.g. SLAs) associated with each hardware instance 741 and VNF instances 742 in use; usage data (e.g. type of load, quantity and period) associated with any particular fault of any particular hardware instance 741 and VNF instances 742 in use; network behavior (actual performance) associated with each hardware instance 741 and VNF instances 742 in use; and a type of preventive maintenance activity and the associated anticipated time by which the preventive maintenance activity should be performed.

These data structures can also be grouped as a hardware database 745 of hardware types 738 and instances 741, and a software database 746 of software (VNF) types 739 and instances 742.

The topology database 743 contains a record for each hardware instance (unit) 741, and each VNF instance 742 in the network. The record defines the location of the hardware instance 741 or VNF instance 742, the relations, such as connectivity, between the hardware instances 741, between the VNF instances 742, and between the VNF instances 742 and hardware instances 741 (e.g. in which they are installed). Additionally, at least one backup unit (such as a hardware instance 741) is defined for each hardware instance 741 and VNF instance 742. When a hardware instance 741 or a VNF instance 742 are being repaired, their functionality is moved to the backup unit.

Every record of the activity database 744 includes: the hardware instances 741 or VNF instances 742 for which preventive maintenance activity is scheduled; the scheduled preventive maintenance activity; the time of the scheduled preventive maintenance activity and its anticipated length; and the backup unit scheduled to replace the maintained hardware instance 741, or to host the maintained VNF instance 742.

Figure 8:
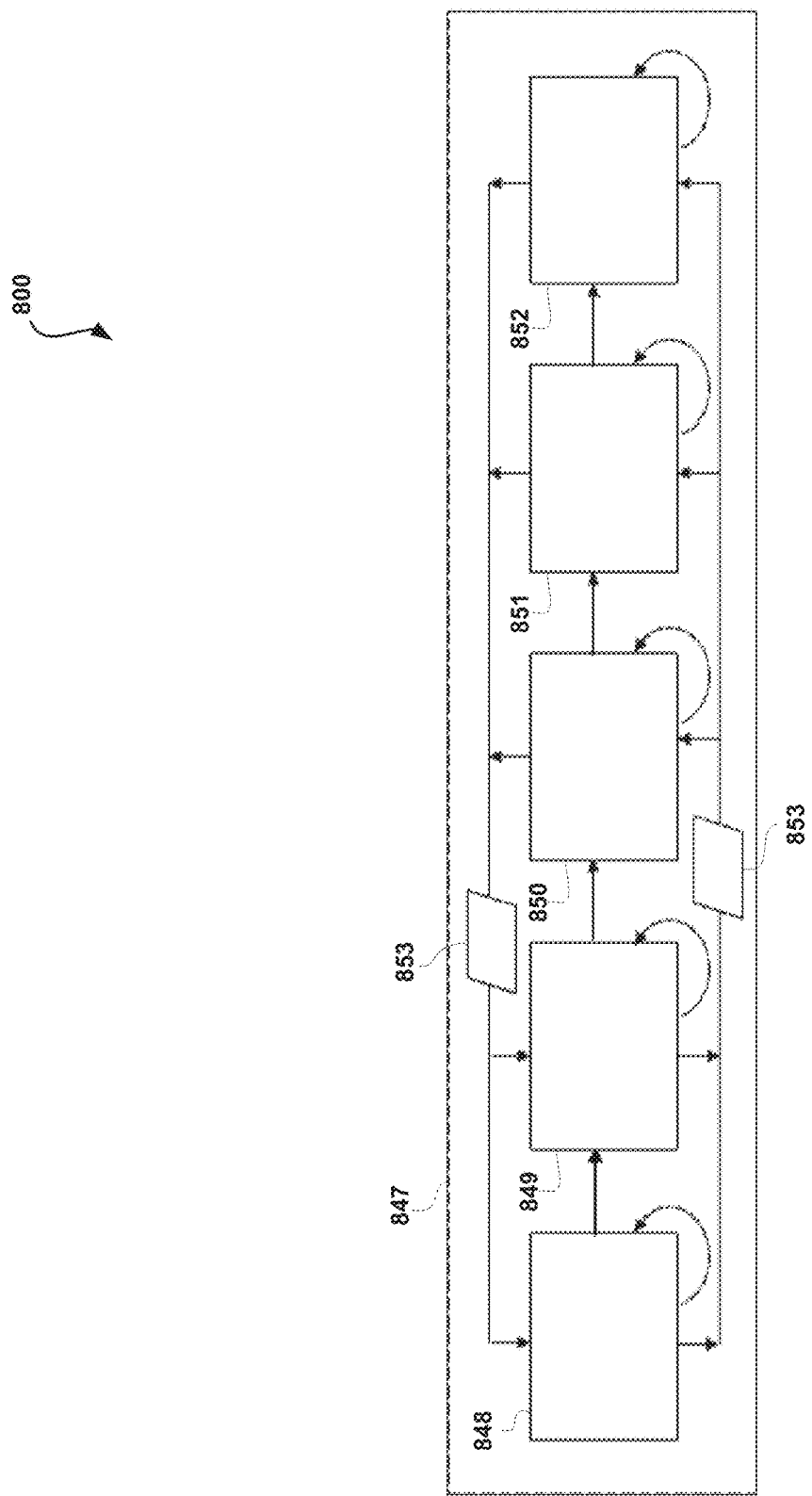
FIG. 8 is a simplified block diagram of a preventive maintenance procedure in an NFV-based network, in accordance with one embodiment.

FIG. 8 illustrates a simplified diagram 800 of a preventive maintenance procedure, in accordance with one embodiment. As an option, the diagram 800 may be viewed in the context of the details of the previous Figures. Of course, however, the diagram 800 may be viewed in the context of any desired environment. Further, the aforementioned definitions may equally apply to the description below.

The goal of the preventive maintenance procedure 847 is to schedule preventive maintenance activities while preserving the network's performance, while requiring minimum backup resources. The preventive maintenance procedure 847 includes various modules (e.g. processed (executed) concurrently).

For example, the preventive maintenance procedure 847 includes tracking module 848 that tracks the network continuously to anticipate the preventive maintenance needs. The tracking module 848 may be part of, or receive data from, assurance and a performance management module. The tracking module 848 collects data for each type of hardware unit, SDN module, and VNF module, as well as operating data for each instance of hardware unit, SDN module, and VNF module (e.g. using the records of hardware instances and software (VNF) instances). The tracking module 848 also calculates statistical data associated with the various faults as defined for each hardware unit, SDN module, and VNF module (e.g. using the records of hardware types and VNF types).

Operating data refer to values such as load, time of operation, temperature and humidity, cycles of operations including activation and deactivation, consumption, including memory consumption, etc. The tracking module 848 also tracks and calculates statistical data regarding the time it takes to prepare a unit or module for maintenance and the time it takes to complete the maintenance activity. According to the collected and calculated data, the tracking module 848 computes the period (earliest time and latest time) in which preventive maintenance should be performed for each type and for each instance of hardware unit, SDN module, and VNF module.

The tracking module 848 also automatically tracks and collects from the NFV-based network and/or infrastructure data regarding the configuration of hardware unit and/or instances such as computing devices and their types, as used in the NFV-based network. The tracking module 848 also automatically tracks and collects from the NFV-based network and/or infrastructure data regarding the allocation VNFs and VNF instances to hardware unit and instances.

Planning module 849 schedules preventive maintenance activities within the available resources so that the network's performance is secured, typically in coordination with a service policy management module and with a deployment optimization module.

For example, planning module 849 may communicate schedules of preventive maintenance activities to the deployment optimization module so that the deployment optimization module may avoid initiating a VNF instance associated with a hardware unit while a preventive maintenance activity is in process, or shortly before the time in which the hardware unit is scheduled for preventive maintenance, etc. Thus, preventive maintenance procedure 847 disables initiation of a VNF instance before initiating a preventive maintenance activity related to the VNF instance.

It is appreciated that planning module 849 may also prevent the initiation of a VNF instance if the respective life expectancy of the VNF instance extends beyond the scheduled maintenance. Similarly, planning module 849 may also prevent the allocation of a VNF instance to a hardware instance (or a computing device) if the respective life expectancy of the hardware instance is shorter than the life expectancy of the VNF instance.

Activation module 850 activates and/or performs preventive maintenance activities according to their schedule as set by the planning module 849. Restoration module 851 restores services to their original configuration after all the relevant maintenance activities are completed.

Alarm module 852 analyzes and anticipates potential critical situations and adverse events, their causes and their priority.

Every module of the preventive maintenance procedure 847 (i.e. modules 848-852) may have a user interface, enabling a user to set operational parameters, receive alarms, notifications, and reports, examine the process, and intervene in the process or control it. Preventive maintenance procedure 847 (i.e. modules 848-852) may also enable a user or an administrator to determine operational parameters of the preventive maintenance procedure 847 as follows: define constraints on scheduling preventive maintenance activities; define computing device types, define 'time to maintenance' value for a computing device type; define 'time of maintenance' value for a computing device type; define 'life expectancy' value for a computing device type; define a VNF type; define 'time to maintenance' value for a VNF type; define 'time of maintenance' value for a VNF type; define 'life expectancy' value for a VNF and/or a VNF instance, etc.

In one embodiment, the modules of the preventive maintenance procedure 847 (i.e. modules 848-852) may communicate via a maintenance database 853.

Figure 9:
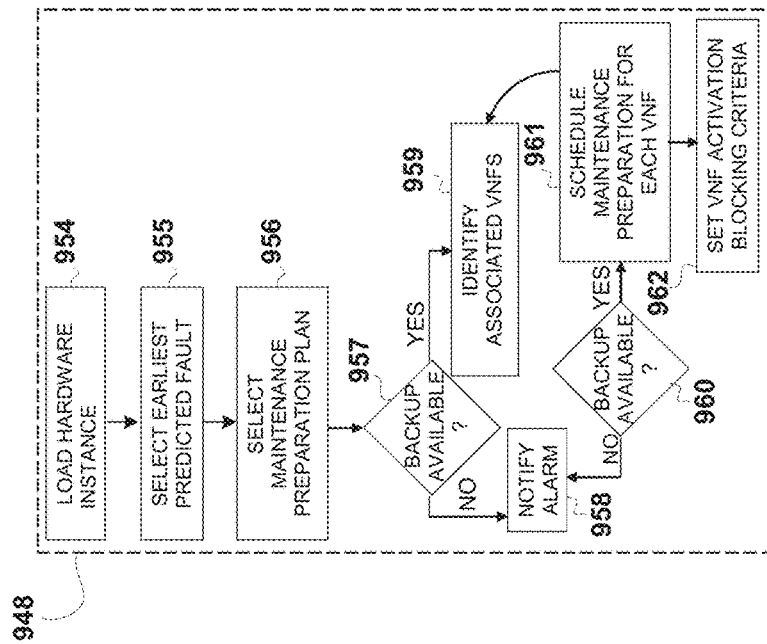
FIG. 9 is a simplified flow chart of a planning module for scheduling preventive maintenance activities in an NFV-based network, in accordance with one embodiment.

FIG. 9 illustrates a simplified flow chart 900 of a planning module, in accordance with one embodiment. As an option, the flow chart 900 may be viewed in the context of the details of the previous Figures. For example, planning module 948 of FIG. 9 may represent the planning module 849 of FIG. 8, etc. Of course, however, the flow chart 900 may be viewed in the context of any desired environment. Further, the aforementioned definitions may equally apply to the description below.

Planning module 948 schedules preventive maintenance activities to each and every instance of hardware unit, SDN module, and VNF module according to the accumulated data, statistical analysis, and anticipated usage. Scheduling a preventive maintenance activity includes scheduling one or more backup units to each hardware instance and one or more backup VNF instances associated with particular preventive maintenance activities.

It is appreciated that a maintenance activity performed on a particular hardware instance may require shutting down all the VNF instances allocated to that particular hardware instance. Therefore, all these VNF instances should be migrated to their backup units.

It is also appreciated that a maintenance activity performed on a particular VNF type installed in a particular hardware instance may require shutting down all the VNF instances of that particular VNF type allocated to that particular hardware instance. Therefore, all these VNF instances should be migrated to their backup units, but not necessarily VNF instances of different VNF types.

It is further appreciated that a maintenance activity performed on a particular VNF type may require shutting down all the VNF instances installed in the same hardware instance, including VNF instances of other VNF types. For example, if the maintenance activity requires maintenance to a shared memory or storage resource, or a shared communication resource.

Preventive maintenance is typically associated with a particular hardware device, even if the maintenance activity is confined to software only, such as a soft reset, memory defragmentation (garbage collection), or downloading a new software release. The hardware device may execute several VNF instances, and even several types of VNFs. Different VNFs may be associated with different services, customers, sessions, etc. Clearing a particular hardware device for maintenance requires migrating all active VNFs to other devices without disrupting or degrading the service.

A preventive maintenance procedure may also provide data to the deployment, activation and provisioning modules to ensure that the deployment and/or activation of a new service takes in account the needs for preventive maintenance and leaves available enough resources to enable timely maintenance activities.

The preventive maintenance procedure may also provide data to the policy, accounting and billing modules to incorporate the cost of preventive maintenance in the pricing of plans and SLAs in accordance with their respective usage of VNFs, as well as their effect on the network configuration.

As shown in FIG. 9, the planning module 948 starts with step 954 by loading a hardware instance record and its respective record of a hardware type. From these records, the planning module 948 concludes and selects in step 955 a fault having the earliest predicted time. That is the period for the earliest required preventive maintenance activity.

In step 956, the planning module 948 selects the maintenance preparation plan associated with the selected fault. The maintenance preparation plan includes a list of backup facilities (typically, one or more instances of hardware units and VNF modules). In step 957, the planning module 948 then checks that the backup facilities are available as needed (considering processing power, memory and storage space, bandwidth, etc.) and if backup is unavailable notify an alarm module (step 958).

If backup facilities are available as needed, the planning module 948 proceeds to step 959 to identify all the VNF instances associated with the fault maintenance plan. Typically, these VNF instances are running on the hardware instance to be maintained. However, in some situations there are other VNF instances that should be relocated or replaced or otherwise require the use of a backup VNF instance.

The planning module 948 then verifies that all these VNF instances have their backup available (step 960). If backup is available, the planning module 948 schedules a maintenance preparation activity for each of the VNF instances (step 961). Such maintenance preparation activity typically relocates the VNF instance to the respective backup facility. Finally, the planning module 948 activates blocking criteria (step 962) to eliminate further activation of any process or instance for these hardware instances to be maintained and/or to be used as backup facilities, and VNF instances.

Figure 10:
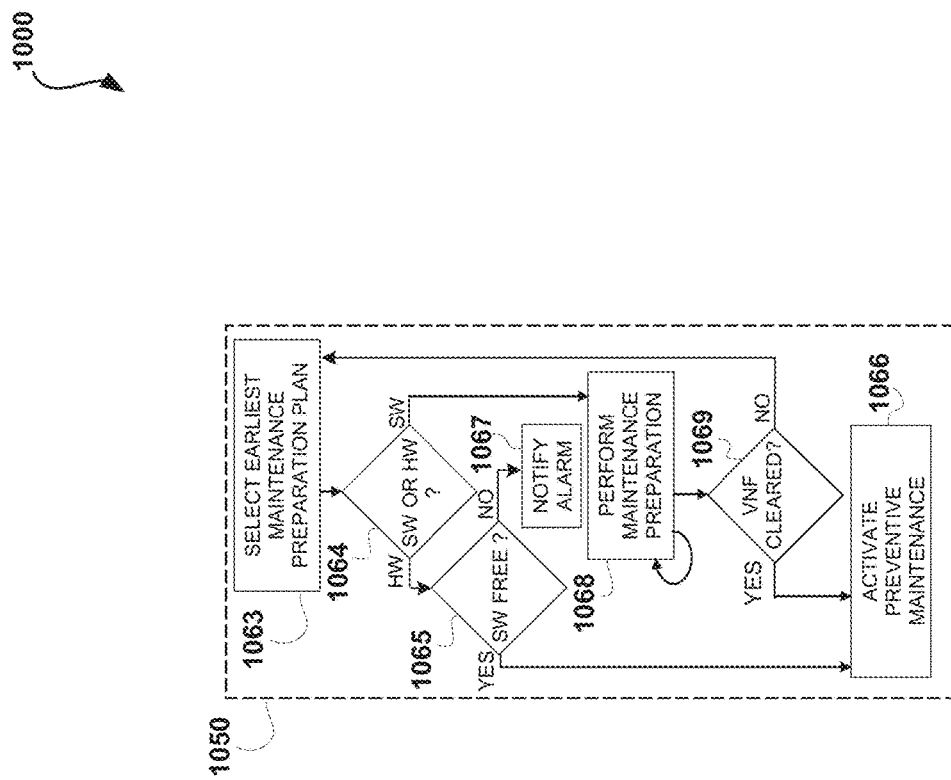
FIG. 10 is a simplified flow chart of a maintenance activation module in an NFV-based network, in accordance with one embodiment.

FIG. 10 illustrates a simplified flow chart 1000 of a maintenance activation module, in accordance with one embodiment. As an option, the flow chart 1000 may be viewed in the context of the details of the previous Figures. For example, maintenance activation module 1050 of FIG. 10 may represent the activation module 850 of FIG. 8. Of course, however, the flow chart 1000 may be viewed in the context of any desired environment. Further, the aforementioned definitions may equally apply to the description below.

After the maintenance planning module has scheduled all the maintenance preparation activities, maintenance activation module 1050 may perform the maintenance preparation activities and thereafter activate the maintenance activity itself.

In one embodiment, the activation module 1050 starts with step 1063 by selecting the earliest planned maintenance preparation activity. In step 1064, the activation module 1050 checks if the preparation activity refers to a hardware unit (instance) and then (step 1065) verifies that all VNF instances associated with the hardware unit are relocated (so that the hardware unit is "software free") and then (step 1066) activates the preventive maintenance activity. If the hardware unit is not software free, the activation module 1050 aborts and notifies the alarm module (step 1067).

If the planned maintenance preparation activity refers to a VNF, the activation module 1050 proceeds to step 1068 to perform the maintenance preparation activity, that is, to migrate the function performed by the VNF instance to the planned backup hardware unit and/or VNF instance. This activity may repeat for all the instances of the particular VNF residing on the particular hardware unit. When the VNF is cleared (step 1069), that is, when all VNF instances of the same type are migrated from the particular hardware unit to their backup locations, the activation module 1050 activates the preventive maintenance activity (step 1066).

Figure 11:
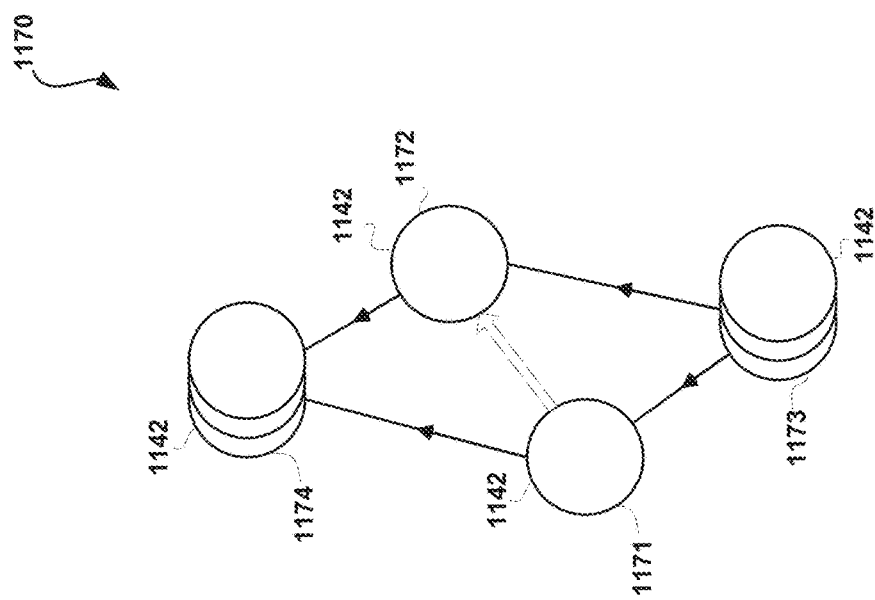
FIG. 11 is a simplified block diagram of an NFV-based sub-network undergoing a preventive maintenance activity, in accordance with one embodiment.

FIG. 11 illustrates a simplified flow chart of an NFV-based sub-network undergoing preventive maintenance activity, in accordance with one embodiment. As an option, the flow chart may be viewed in the context of the details of the previous Figures. Of course, however, the flow chart may be viewed in the context of any desired environment. Further, the aforementioned definitions may equally apply to the description below.

As shown in FIG. 11, sub-network 1170 includes four types of VNF instances 1142: a migrating VNF instance indicated by numeral 1171, a destination VNF instance indicated by numeral 1172, one or more source VNF instances indicated by numeral 1173, and one or more addressable VNF instances indicated by numeral 1174. Source VNF 1173 represents any number of VNF instances sending data to the migrating VNF 1171. Addressable VNFs 1174 represent any number of VNF instances receiving data from the migrating VNF 1171.

A maintenance preparation procedure migrates the functionality of VNF instance 1171 to VNF instance 1172 while preserving service continuity between VNF instances 1173 and VNF instances 1174.

Figure 12:
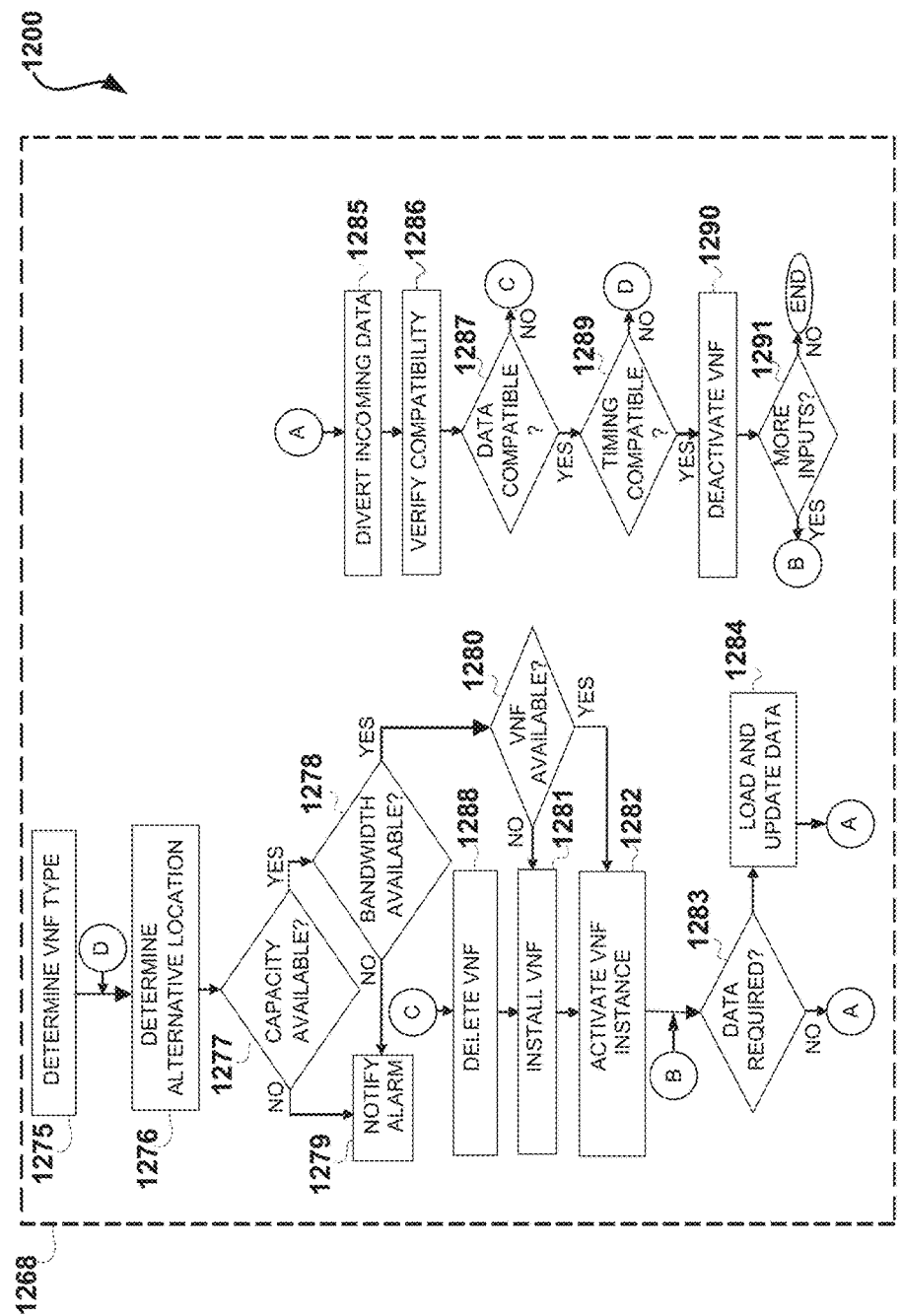
FIG. 12 is a simplified flow chart of a maintenance preparation procedure, in accordance with one embodiment.

FIG. 12 illustrates a simplified flow chart 1200 of a maintenance preparation procedure, in accordance with one embodiment. As an option, the flow chart 1200 may be viewed in the context of the details of the previous Figures. Of course, however, the flow chart 1200 may be viewed in the context of any desired environment. Further, the aforementioned definitions may equally apply to the description below.

Maintenance preparation procedure 1268 is an example of migrating a VNF in an NFV-based network. Maintenance preparation procedure 1268 applies to preventive maintenance, however, the process described in maintenance preparation step 1268 also applies to other situations including an activity requiring the preservation of service continuity such as network optimization and product replacement. Maintenance preparation procedure 1268 describes, by way of an example, a method of migrating and deactivating a VNF instance (hereinbelow "replaced VNF instance") while preserving session continuity.

In one embodiment, maintenance preparation procedure 1268 starts with steps 1275 and 1276 by determining the VNF type of the VNF instance to be migrated (replaced VNF instance), and the alternative location, or the target or destination computing facility, to where the VNF instance is to be migrated. It is appreciated that the replaced VNF instance, or the functionality of the replaced VNF instance, can be migrated within the same computing facility.

For example, when migrating a VNF functionality to an upgraded version of the VNF type, or another product supporting a VNF type of a similar functionality.

The maintenance preparation procedure 1268 proceeds to step 1277 and step 1278 to verify that capacity is available at the destination computing facility (alternative location), and that traffic bandwidth is available from the source VNF to the destination VNF. If capacity or bandwidth is unavailable, the process aborts and notifies the alarm module (step 1279). Capacity refers to processing power, memory, storage, etc. Bandwidth refers to the traffic requirements from any source VNF instance to destination VNF instance, as well as traffic requirements from destination VNF instance to any addressable VNF instance.

If capacity and bandwidth are available maintenance preparation procedure 1268 checks (step 1280) if VNF software compatible with the destination VNF is already installed in the destination computing facility and installs the VNF software if necessary (step 1281).

The maintenance preparation procedure 1268 proceeds to activate the destination VNF instance (step 1282). If the destination VNF instance requires data and/or content (step 1283) the maintenance preparation procedure 1268 may load or update the required data and/or content to the destination VNF instance (step 1284). Then the maintenance preparation procedure 1268 diverts the communication from the source VNF instances (feeding the replaced VNF instance) to the destination VNF instance (step 1285).

If necessary, the maintenance preparation procedure 1268 may execute a compatibility verification (step 1286). A compatibility verification procedure may include comparing the output of the destination VNF instance with the outputs of the replaced VNF instance. It is appreciated that in this case the data flows from the source VNF instances are duplicated so that both the replaced VNF instance and the destination VNF instance receive the inputs substantially simultaneously.

The compatibility may be verified in step 1286 regarding data (and/or content) and transmission and/or timing parameters (e.g., bandwidth, latency, jitter, etc.). If the data of the outputs of the replaced VNF instance and the destination VNF instance is not the same (step 1287) the maintenance preparation procedure 1268 may remove the VNF destination instance (step 1288) and repeat the installation process. If the transmission or timing parameters of the outputs of the destination VNF instance is incompatible with the requirements (step 1289) the maintenance preparation procedure 1268 may seek a different location for the VNF destination instance.

Thereafter, the maintenance preparation procedure 1268 deactivates the VNF instance (step 1290). If there are a plurality of inputs (step 1191) maintenance preparation procedure 1268 may repeat steps 1283 to 1290 as necessary.

It is appreciated that alternatively steps 1285 and 1286 may be executed after data and contents are loaded and/or updated for all the inputs. It is appreciated that the compatibility verification process can be executed for each input independently and/or for any group of inputs.

The maintenance preparation procedure 1268 has been described above referring to the migration of a single VNF. However, as described above, a service may include a plurality of VNFs and/or VNF instances. Such plurality of VNFs and/or VNF instances making a service is also named a VNF chain or sub-network. Two or more VNFs and/or VNF instances of such VNF chain or sub-network may have particular inter-related requirements. For example, such two or more VNFs and/or VNF instances may require particular bandwidth, latency, jitter, etc. between them. In such case, a process of VNF migration as described above with reference to maintenance preparation procedure 1268 and/or FIG. 12 may affect such two or more VNF instances or the entire chain or sub-network. Consequently, the steps of installing, updating, diverting, verifying compatibility, and deactivating may apply to a plurality of VNF instances taken together.

It is therefore appreciated that embodiments of the present invention as described above include a system, method, and computer program product for preserving service continuity in a communication network using network function virtualization. Service continuity is particularly preserved while performing network activities such as preventive maintenance network optimization, and/or product replacement. In one embodiment, service continuity is preserved for each instance of a virtual network function before initiating any of the above activities relating to the particular VNF, or a service including such VNF.

The method for preserving service continuity according to embodiments of the present invention may include at least one of the following activities: disabling initiation of a new instance of a virtual network function in a processing facility before migrating an instance of the virtual network function from the processing facility; initiating an instance of a virtual network function in a first processing facility before deactivating an instance of the virtual network function in a second processing facility; migrating an instance of a virtual network function from a first processing facility to a second processing facility before deactivating the instance of the virtual network function in the first processing facility; and/or diverting communication addressed to a first instance of a virtual network function in a first processing facility to a second instance of the virtual network function in second processing facility before deactivating the first instance. The techniques described above apply when the VNF is migrated between different processing facilities or within the same processing facility.

Figure 13:
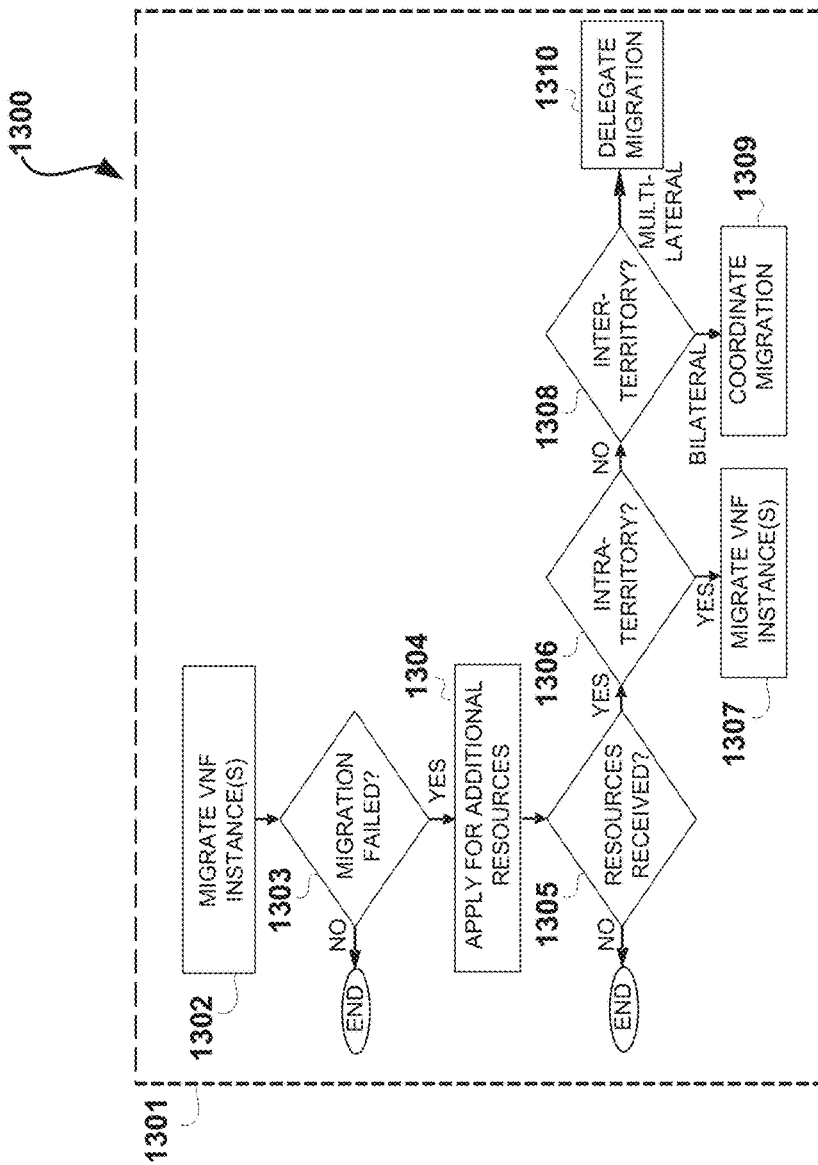
FIG. 13 illustrates a simplified flow chart of a maintenance preparation procedure operating in a multi-NFV-O environment, in accordance with one possible embodiment.

FIG. 13 illustrates a simplified flow chart 1300 of a maintenance preparation procedure operating in a multi-NFV-O environment, in accordance with one possible embodiment.

An example on the multi-NFV-O environment is provided above with reference to FIG. 6, describing a hierarchical NFV-O deployment. In the hierarchical NFV-O deployment of FIG. 6 the maintenance preparation procedure (as shown and described with reference to FIG. 12) operates within the scope of a single NFV-O, such as an NFV-O leaf component.

FIG. 13 illustrates a simplified flow chart 1300 of a component 1301 of the maintenance preparation procedure operative when the particular NFV-O components, such as a leaf NFV-O component, is unable to migrate one or more VNFs within its territory. That is, between hardware units or other resources assigned to the particular NFV-O.

As an option, the flow chart 1300 may be viewed in the context of the details of the previous Figures. Of course, however, the flow chart 1300 may be viewed in the context of any desired environment. Further, the aforementioned definitions may equally apply to the description below.

If the particular (leaf) NFV-O component is unable to migrate a VNF within its territory (steps 1302 and 1303) the NFV-O component may apply for additional resources (step 1304). For example, the NFV-O component may request additional resources from its parent NFV-O component. A parent NFV-O component may then reassign one or more resource from another NFV-O component (e.g., another NFV-O leaf component) to the requesting NFV-O component.

If sufficient resources are acquired (step 1305) there may be the following cases, intra-territorial resource allocation, bilateral inter-territorial resource allocation, and multi-lateral inter-territorial resource allocation.

Intra-territorial resource allocation (steps 1306 and 1307) typically means that one or more resources where reallocated from a first territory (typically managed by a first leaf NFV-O component) to a second territory (typically managed by a second leaf NFV-O component). The reallocated resources are now part for the second territory and the requesting NFV-O may proceed to migrate the VNF instance(s) as shown and described above with reference to FIG. 12.

Inter-territorial resource allocation typically means that one or more resources are assigned to the requesting (second) NFV-O, however, under the management of the providing (first) NFV-O. In simple cases such as bilateral inter-territorial resource allocation (only two NFV-O modules are involved) the migration is typically coordinated. In a coordinated migration each of the NFV-O modules involved executes a part of the process shown and described above with reference to FIG. 12 (steps 1308 and 1309 of FIG. 13).

Multi-lateral inter-territorial resource allocation (step 1310) typically means that several NFV-Os are involved, or that any other complexity requires that the execution of the process shown and described above with reference to FIG. 12 is delegated to a superior NFV-O module, such as a parent or core NFV-O module.

It is appreciated that the execution of the process shown and described above with reference to FIG. 12 may be delegated to an NFV-O module of a different hierarchy. For example, from a geographical NFV-O hierarchy to a (module of) service NFVO hierarchy or a (module of) customer NFVO hierarchy.

In step 1286 of FIG. 12, the maintenance preparation procedure 1268 verifies that the new (destination) VNF is compatible with the old (replaced) VNF. The maintenance preparation procedure 1268 may verify compatibility by comparing corresponding output data of the new and old VNFs. In some cases, the service provided by the migrated VNF is active at the time of compatibility verification and inputs are available to both the old and new VNFs, producing compatible (or incompatible) outputs. In some cases, the service provided by the migrated VNF is active at the time of compatibility verification and inputs are not available. In the later cases, the maintenance preparation procedure 1268 may introduce 'artificial inputs' to the new and old VNF to generate outputs that can be compared to verify compatibility.

The artificial input, as described above, may be test data as used to test the particular VNF program. However, in the case of the maintenance preparation procedure 1268 and/or step 1286 of verifying compatibility, the test data is used to check that the data used by the destination VNF instance is compatible with the data used by the replaced VNF instance.

Figure 14:
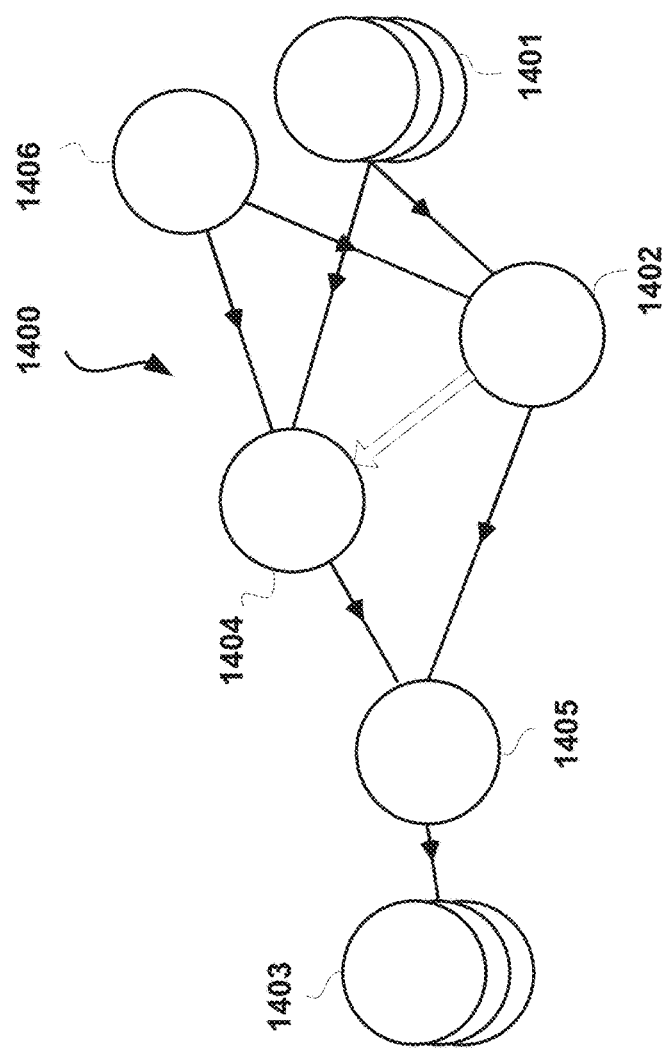
FIG. 14 illustrates a simplified block diagram of an NFV-based sub-network undergoing compatibility verification, in accordance with one embodiment.

FIG. 14 illustrates a simplified block diagram of an NFV-based sub-network 1400 undergoing compatibility verification, in accordance with one embodiment. As an option, the block diagram may be viewed in the context of the details of the previous Figures. Of course, however, the flow chart may be viewed in the context of any desired environment. Further, the aforementioned definitions may equally apply to the description below.

FIG. 14 shows one or more source VNF instances 1401 providing input data to a replaced VNF instance 1402, which generates output data for one or more VNF instances 1403.

As part of a VNF migration process, such as maintenance preparation procedure described above, a destination VNF instance 1404 is provided to replace VNF instance 1402. As part of a compatibility verification process, such as step 1286 shown and described above with reference to FIG. 12, a compatibility verification VNF instance 1405 is provided. Compatibility verification VNF instance 1405 receives the outputs of the replaced VNF instance 1402 and the destination VNF instance 1404 and compares them to verify that the destination VNF instance 1404 is compatible with the replaced VNF instance 1402. As shown in FIG. 14, compatibility verification VNF instance 1405 transfers the output (such as the output of the replaced VNF instance 1402) to the one or more VNF instances 1403. Additionally, and/or optionally, for example if one or more of VNF instances 1401 is inactive, a testing VNF instance 1406 is provided, typically also as a part of a compatibility verification process, such as step 1286 shown and described above with reference to FIG. 12. Testing VNF instance 1406 is connected to the inputs of the replaced VNF instance 1402 and the destination VNF instance 1404 to provide 'artificial' input data to be compared by the compatibility verification VNF instance 1405.

It is appreciated that the testing VNF instance 1406 may add a mark or a tag or a similar means of identification to input data sent to the replaced VNF instance 1402 and the destination VNF instance 1404 to identify the data as 'testing data'. Thereafter, the replaced VNF instance 1402 and the destination VNF instance 1404 may produce output data bearing the test marks (or tags, or similar means f identification) and send it to the compatibility verification VNF instance 1405. Thereafter, the compatibility verification VNF instance 1405 may identify the particular output data received from the replaced VNF instance 1402 and the destination VNF instance 1404 as testing data and refrain from forwarding this data downstream (e.g. to the one or more VNF instances 1403). This enables the system as described in FIG. 14 to operate the testing VNF instance 1406 while providing service to customers.

If the compatibility verification is successful, the destination VNF instance 1304 is connected directly to the one or more VNF instances 1403, and the compatibility verification VNF instance 1405 and the testing VNF instance 1406 are removed.

Figure 15:
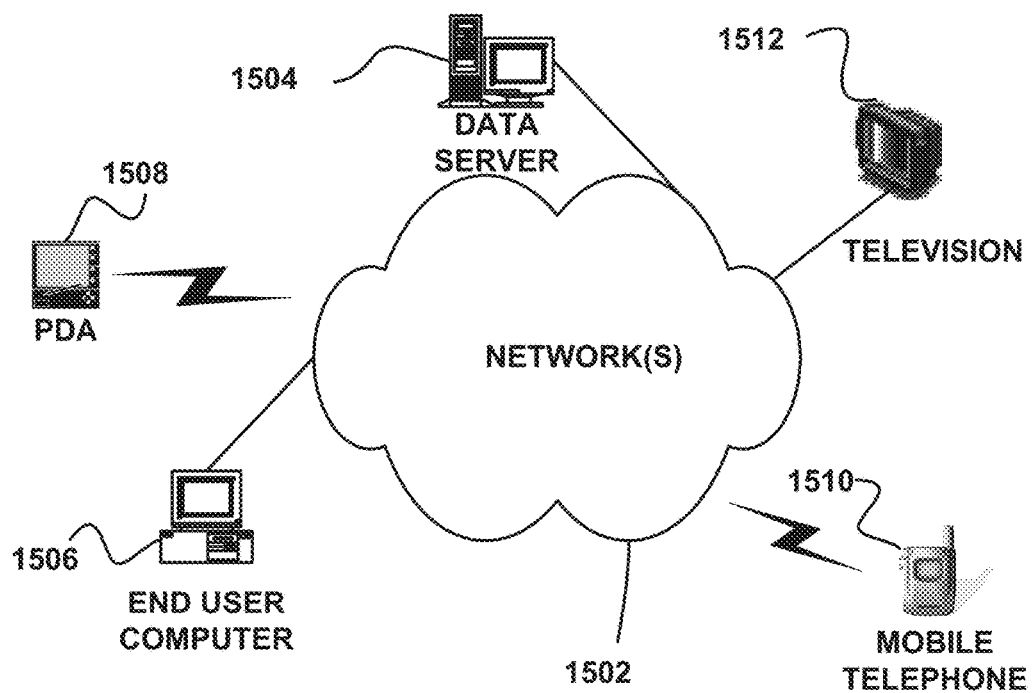
FIG. 15 illustrates a network architecture, in accordance with one possible embodiment.

FIG. 15 illustrates a network architecture 1500, in accordance with one possible embodiment. As shown, at least one network 1502 is provided. In the context of the present network architecture 1500, the network 1502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1502 may be provided.

Coupled to the network 1502 is a plurality of devices. For example, a server computer 1504 and an end user computer 1506 may be coupled to the network 1502 for communication purposes. Such end user computer 1506 may include a desktop computer, lap-top computer, and/or any other type of logic. Still yet, various other devices may be coupled to the network 1502 including a personal digital assistant (PDA) device 1508, a mobile phone device 1510, a television 1512, etc.

Figure 16:
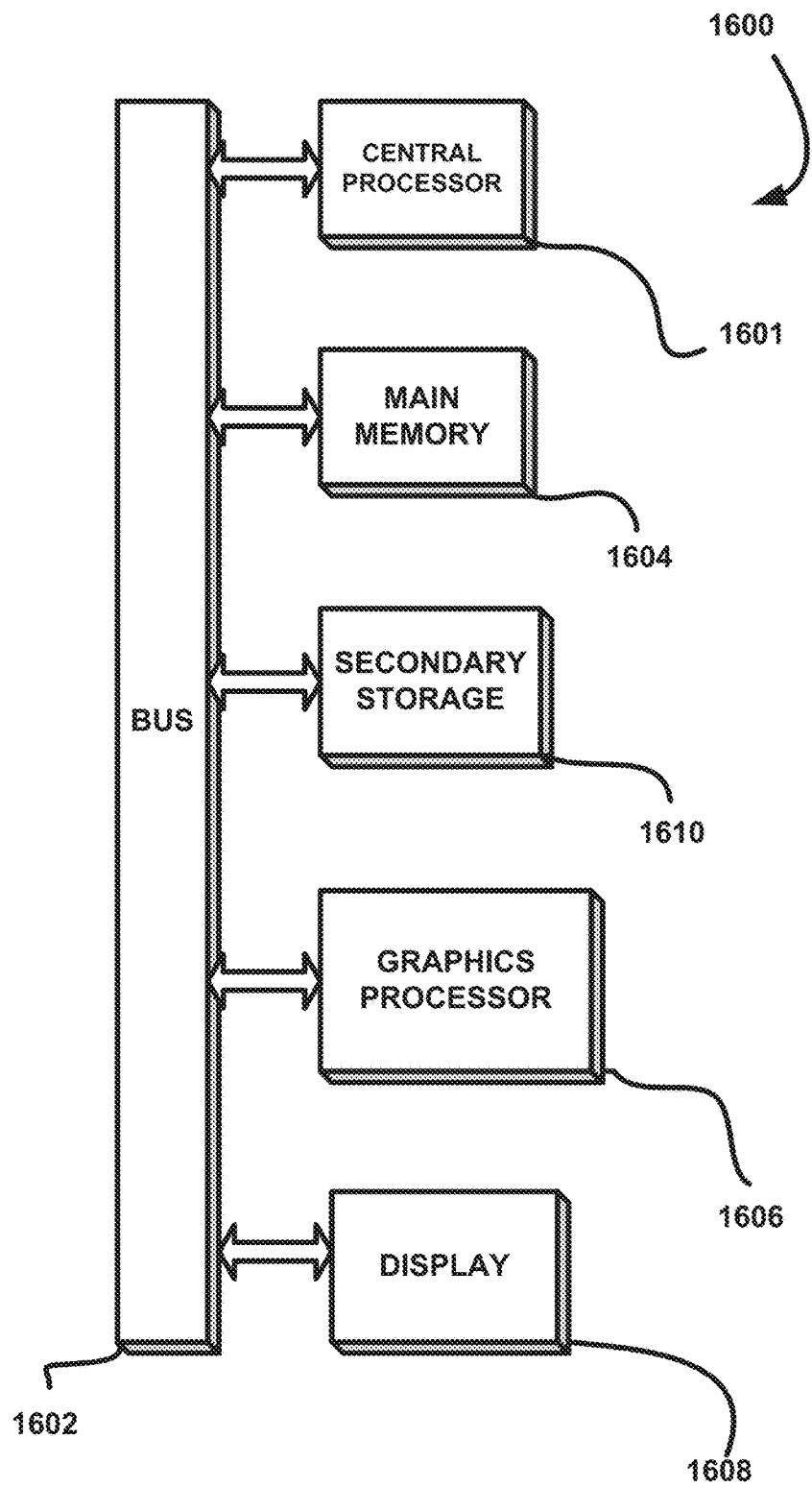
FIG. 16 illustrates an exemplary system, in accordance with one embodiment.

FIG. 16 illustrates an exemplary system 1600, in accordance with one embodiment. As an option, the system 1600 may be implemented in the context of any of the devices of the network architecture 1500 of FIG. 15. Of course, the system 1600 may be implemented in any desired environment.

As shown, a system 1600 is provided including at least one central processor 1601 which is connected to a communication bus 1602. The system 1600 also includes main memory 1604 [e.g. random access memory (RAM), etc.]. The system 1600 also includes a graphics processor 1606 and a display 1608.

The system 1600 may also include a secondary storage 1610. The secondary storage 1610 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1604, the secondary storage 1610, and/or any other memory, for that matter. Such computer programs, when executed, enable the system 1600 to perform various functions (as set forth above, for example). Memory 1604, storage 1610 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying a first potential fault in a first resource in a Network Function Virtualization based (NFV-based) communication network, the first resource including a first instance of a virtual network function (VNF);
   identifying a first time for maintaining the first resource to prevent an occurrence of the first potential fault, the first time being a time for performing a preventive maintenance activity on the first resource;
   identifying a second resource for replacing the first resource during the first time; and
   verifying compatibility of the second resource with the first resource by:
      installing a second instance of the VNF on the second resource,
      providing a same data flow as input to each of the first instance of the VNF and the second instance of the VNF,
      identifying a first output of the first instance of the VNF resulting from the data flow input to the first instance of the VNF,
      identifying a second output of the second instance of the VNF resulting from the data flow input to the second instance of the VNF, and
      comparing the first output with the second output,
      using the second resource to replace the first resource during the first time when the first output and the second output are determined from the comparison to be the same, and
      preventing the second resource from replacing the first resource during the first time when the first output and the second output are determined from the comparison to not be the same.

2. The method of claim 1, further comprising securing availability of the second resource for the VNF for the first time.

3. The method of claim 1, further comprising replacing the first resource with the second resource during the first time by:
   initiating the second instance of VNF in the second resource, and
   after the initiating, deactivating the first instance of the VNF in the first resource.

4. The method of claim 3, wherein replacing the first resource with the second resource during the first time further includes diverting communication addressed to the first instance of the VNF in the first resource to the second instance of the VNF in second resource before deactivating the first instance of the VNF in the first resource.

5. The method of claim 1, wherein the second resource is identified for replacing the first resource during the first time from a predefined maintenance preparation plan associated with the first resource, the predefined maintenance preparation plan specifying at least the second resource as a backup resource for the first resource.

6. A computer program product embodied on a non-transitory computer readable medium, comprising:
   computer code for identifying a first potential fault in a first resource in a Network Function Virtualization based (NFV-based) communication network, the first resource including a first instance of a virtual network function (VNF);
   computer code for identifying a first time for maintaining the first resource to prevent an occurrence of the first potential fault, the first time being a time for performing a preventive maintenance activity on the first resource;
   computer code for identifying a second resource for replacing the first resource during the first time; and computer code for verifying compatibility of the second resource with the first resource by:
  installing a second instance of the VNF on the second resource,
  providing a same data flow as input to each of the first instance of the VNF and the second instance of the VNF,
  identifying a first output of the first instance of the VNF resulting from the data flow input to the first instance of the VNF,
  identifying a second output of the second instance of the VNF resulting from the data flow input to the second instance of the VNF, and
  comparing the first output with the second output,
  using the second resource to replace the first resource during the first time when the first output and the second output are determined from the comparison to be the same, and
  preventing the second resource from replacing the first resource during the first time when the first output and the second output are determined from the comparison to not be the same.

7. The computer program product of claim 6, further comprising computer code for securing availability of the second resource for the VNF for the first time.

8. A system comprising:
a memory system; and
one or more processing cores coupled to the memory system and that are each configured to:
  identify a first potential fault in a first resource in a Network Function Virtualization based (NFV-based) communication network, the first resource including a first instance of a virtual network function (VNF);
  identify a first time for maintaining the first resource to prevent an occurrence of the first potential fault, the first time being a time for performing a preventive maintenance activity on the first resource;
  identify a second resource for replacing the first resource during the first time; and
  verify compatibility of the second resource with the first resource by:
    installing a second instance of the VNF on the second resource,
    providing a same data flow as input to each of the first instance of the VNF and the second instance of the VNF,
    identifying a first output of the first instance of the VNF resulting from the data flow input to the first instance of the VNF,
    identifying a second output of the second instance of the VNF resulting from the data flow input to the second instance of the VNF, and
    comparing the first output with the second output,
    using the second resource to replace the first resource during the first time when the first output and the second output are determined from the comparison to be the same, and
    preventing the second resource from replacing the first resource during the first time when the first output and the second output are determined from the comparison to not be the same.

* * * * *